US012341273B2

(12) United States Patent
Wu et al.

(10) Patent No.: US 12,341,273 B2
(45) Date of Patent: Jun. 24, 2025

(54) ANTENNA UNIT AND COMMUNICATION DEVICE

(71) Applicant: HUAWEI TECHNOLOGIES CO., LTD., Guangdong (CN)

(72) Inventors: Pengfei Wu, Shanghai (CN); Meng Hou, Shanghai (CN); Hanyang Wang, Reading (GB); Chien-Ming Lee, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 18/246,801

(22) PCT Filed: Sep. 9, 2021

(86) PCT No.: PCT/CN2021/117539

§ 371 (c)(1),
(2) Date: Mar. 27, 2023

(87) PCT Pub. No.: WO2022/062914

PCT Pub. Date: Mar. 31, 2022

(65) Prior Publication Data

US 2023/0369769 A1 Nov. 16, 2023

(30) Foreign Application Priority Data

Sep. 28, 2020 (CN) ........................ 202011044876.8

(51) Int. Cl.
*H01Q 9/42* (2006.01)
*H01Q 21/20* (2006.01)

(52) U.S. Cl.
CPC ............... *H01Q 9/42* (2013.01); *H01Q 21/20* (2013.01)

(58) Field of Classification Search
CPC ............ H01Q 9/42; H01Q 21/20; H01Q 3/24; H01Q 9/0442; H01Q 9/045; H01Q 1/243; H01Q 1/48
See application file for complete search history.

(56) References Cited

U.S. PATENT DOCUMENTS 4,379,296 A 4/1983 Farrar et al.
2013/0257674 A1 10/2013 Li et al.
(Continued)

FOREIGN PATENT DOCUMENTS

CN 101931856 A 12/2010
CN 105024134 A 11/2015
(Continued)

OTHER PUBLICATIONS

Behera et al., "Design and Optimization of Dual Band Microstrip Antenna Using Particle Swarm Optimization Technique," Journal of Infrared, Millimeter and Terahertz Waves, Apr. 3, 2010, 10 pages.
(Continued)

*Primary Examiner* — David E Lotter
(74) *Attorney, Agent, or Firm* — Fish & Richardson P.C.

(57) ABSTRACT

An antenna includes a first radiator having a first end and a second end, where the second end or a middle position of the first radiator is grounded; a second radiator having a third end and a fourth end, the fourth end is disposed away from the first end relative to the third end, and the second end or a middle position of the second radiator is grounded; a feeding circuit configured to feed the first radiator and the second radiator, at the first end of the first radiator and the third end of the second radiator; and a tuning circuit configured to selectively connect the feeding circuit to the first end of the first radiator or the third end of the second radiator to feed the first radiator or the second radiator.

20 Claims, 27 Drawing Sheets

(56) References Cited

U.S. PATENT DOCUMENTS

| | | | | |
|---|---|---|---|---|
| 2017/0338546 | A1 | 11/2017 | Wong et al. | |
| 2018/0090822 | A1* | 3/2018 | Wong ........................ | H01Q 1/48 |
| 2018/0183137 | A1 | 6/2018 | Tsai et al. | |
| 2019/0074601 | A1 | 3/2019 | Kim et al. | |

FOREIGN PATENT DOCUMENTS

| | | | |
|---|---|---|---|
| CN | 105789902 | A | 7/2016 |
| CN | 107230825 | A | 10/2017 |
| CN | 107293838 | A | 10/2017 |
| CN | 107437661 | A | 12/2017 |
| CN | 108258405 | A | 7/2018 |
| CN | 110739534 | A | 1/2020 |
| CN | 112018494 | A | 12/2020 |
| EP | 1460713 | B1 | 1/2008 |
| JP | 2000068729 | A | 3/2000 |
| WO | 2013060682 | A1 | 5/2013 |
| WO | 2018232677 | A1 | 12/2018 |

OTHER PUBLICATIONS

Liu et al., "Design of a dual-frequency broadband navigation antenna based on new feeding structure," Telecommunication Engineering, Jun. 26, 2018, 1 page (with English abstract).

Yang et al., "Balanced Fed Differential SIW Slot Antenna Array for Common-Mode Noise Suppression," Journal of Microwaves, vol. 31, No. 6, Dec. 2015, 4 pages (with English abstract).

Office Action in Chinese Appln. No. 202011044876.8, dated Apr. 26, 2023, 5 pages.

Office Action in Chinese Appln. No. 202011044876.8, dated Aug. 23, 2022, 17 pages (with English translation).

International Search Report and Written Opinion in International Appln. No. PCT/CN2021/117539, mailed on Nov. 30, 2021, 19 pages (with English translation).

Extended European Search Report in European Appln. No. 21871286.7, mailed on Jan. 24, 2024, 13 pages.

* cited by examiner

ANTENNA UNIT AND COMMUNICATION DEVICE

CROSS-REFERENCE TO RELATED APPLICATIONS

This application is a National Stage of International Patent Application No. PCT/CN2021/117539, filed on Sep. 9, 2021, which claims priority to Chinese Patent Application No. 202011044876.8, filed on Sep. 28, 2020, both of which are hereby incorporated by reference in their entireties.

TECHNICAL FIELD

Embodiments of this application relate to the field of antenna technologies, and particularly to an antenna unit and a communication device.

BACKGROUND

Currently, a terminal device including a mobile phone may use a metal frame as a part of an antenna to radiate an electromagnetic wave. However, the frame of the terminal device is relatively small. Due to limitations on a shape and a size of the frame, an angle of the antenna cannot be adjusted. Consequently, the electromagnetic wave can be radiated in only one direction, and a radiation pattern of the electromagnetic wave is relatively fixed.

However, in different usage scenarios, a user grips the mobile phone in different postures. For example, in a landscape state, the user grips at horizontal edges of the frame; or in a portrait state, the user grips at vertical edges of the frame. When gripping the mobile phone in the different postures, the user grips at different positions of the frame with fingers. This easily blocks the metal frame, which affects radiation performance of the metal frame.

Due to the single radiation direction of the foregoing frame antenna, it is difficult to meet requirements for both gripping in a landscape mode and gripping in a portrait mode.

SUMMARY

Embodiments of this application provide an antenna unit and a communication device. This resolves a problem that due to a single radiation direction of a frame antenna, it is difficult to meet requirements of a user for gripping in a landscape mode and gripping in a portrait mode.

To achieve the foregoing objective, the following technical solutions are used in this application.

A first aspect provides an antenna unit, including: a first radiator, where the first radiator includes a first end and a second end that are opposite to each other, and the second end of the first radiator or a middle position of the first radiator is grounded; a second radiator, where the second radiator includes a third end and a fourth end that are opposite to each other, the fourth end is disposed away from the first end relative to the third end, and the second end of the second radiator or a middle position of the second radiator is grounded; a feeding unit, where the feeding unit is configured to feed the first radiator and the second radiator, at the first end of the first radiator and the third end of the second radiator; and a tuning unit, where the tuning unit is configured to selectively connect the feeding unit to the first end of the first radiator to feed the first radiator, and selectively connect the feeding unit to the third end of the second radiator to feed the second radiator. The antenna unit has different main radiation directions when the tuning unit connects the feeding unit to only the first radiator and when the tuning unit connects the feeding unit to only the second radiator, and the main radiation direction of the antenna unit is a direction with a greatest directivity in a radiation pattern of the antenna unit. Main radiation directions of radiators designed at different angles are different. In embodiments of this application, a plurality of different radiators (different in angle and/or different in structure, where being different in angle may refer to that the radiators form a specific included angle, and being different in structure may refer to that a coupling structure is disposed at both ends or a middle position of the radiator, and a main radiation direction of the radiator changes under an action of the coupling structure) are disposed, and the tuning unit connects the feeding unit to at least one radiator, so as to implement radiation pattern coverage in a plurality of directions in a same frequency band. Therefore, the main radiation direction of the antenna unit may be flexibly adjusted according to different griping positions of a user in different usage scenarios to reduce impact of griping by the user on antenna radiation performance.

In an optional implementation, an included angle between an extension direction of the first radiator at the first end and an extension direction of the second radiator at the third end is a first angle. The first angle ranges from 60° to 120°. Preferably, the first angle is 90°.

In an optional implementation, when the tuning unit connects the feeding unit to the first end of the first radiator, the main radiation direction of the antenna unit is a first direction. When the tuning unit connects the feeding unit to the third end of the second radiator, the main radiation direction of the antenna unit is a second direction. An included angle between the first direction and the second direction is a second angle. Therefore, if angles between the radiators are different, main radiation directions of different radiators are different.

In an optional implementation, the antenna unit further includes a feeding coupling structure and a grounding coupling structure, where the feeding coupling structure is disposed among the feeding unit, the first end of the first radiator, and the third end of the second radiator, the feeding coupling structure is coupled to the first radiator and the second radiator, and the feeding unit is electrically connected to the feeding coupling structure; and a grounding coupling structure, where the grounding coupling structure is disposed between the second end of the first radiator and a ground plane or between the middle position of the first radiator and a ground plane, and is disposed between the fourth end of the second radiator and the ground plane or between the middle position of the second radiator and the ground plane, the grounding coupling structure is coupled to the first radiator and the second radiator, and the grounding coupling structure is electrically connected to the ground plane; when the tuning unit connects the feeding unit to feed the first radiator through the feeding coupling structure and the grounding coupling structure, the main radiation direction of the antenna unit is a third direction; when the tuning unit connects the feeding unit to feed the second radiator through the feeding coupling structure and the grounding coupling structure, the main radiation direction of the antenna unit is a fourth direction; an included angle between the third direction and the fourth direction is a third angle; and the third angle is greater than the second angle. When the grounding coupling structure is close to the second end of the radiator, an operating mode of the radiator is a differential mode, or when the grounding coupling structure is close to the middle position of the radiator, an operating mode of the radiator is a common mode. In the differential mode and the common mode, the radiator has different main radiation directions. The main radiation direction of the antenna unit may be flexibly adjusted by switching between the differential mode and the common mode of the radiator, thereby reducing the impact of gripping by the user on the antenna radiation performance. In addition, a coupled feeding mode is used to facilitate placement of the antenna away from the ground plane. Therefore, disposing the grounding coupling structure may change the main radiation direction of the antenna unit to further enlarge a deflection angle of the main radiation direction of the antenna unit in a rotation process.

There are a plurality of feeding coupling structures. Each of the feeding coupling structures is coupled to one of the first radiator and the second radiator. The tuning unit is disposed between the feeding unit and the feeding coupling structure. The feeding unit is electrically connected to the feeding coupling structure through the tuning unit. Therefore, switching between different radiation modes may be implemented by controlling connection/disconnection of the feeding unit.

There is one feeding coupling structure. Each of the first radiator and the second radiator is coupled to one edge of the feeding coupling structure. The tuning unit is disposed between the feeding coupling structure and the ground plane. The feeding coupling structure is electrically connected to the ground plane through the tuning unit. In this case, a plurality of radiators share one feeding coupling structure, so that more space is saved, and miniaturization of the antenna is facilitated.

In an optional implementation, the antenna unit further includes a third radiator, where the third radiator includes a fifth end and a sixth end that are opposite to each other, the sixth end of the third radiator is disposed away from the first end of the first radiator relative to the fifth end, and the sixth end of the third radiator or a middle position of the third radiator is coupled to the ground plane; the feeding unit is coupled to the fifth end of the third radiator, and the feeding unit is configured to feed the third radiator; and the tuning unit is configured to selectively connect the feeding unit to the third radiator to feed the third radiator. Therefore, disposing the third radiator may further enlarge an adjustment range of the main radiation direction may be further enlarged.

In an optional implementation, an included angle between the first radiator and the third radiator or between the second radiator and the third radiator is a fourth angle. The fourth angle ranges from 60° to 120°.

In an optional implementation, the tuning unit connects the third radiator to the feeding unit. Alternatively, the tuning unit connects one or both of the first radiator and the second radiator to the feeding unit. Alternatively, the tuning unit connects all of the third radiator and one or both of the first radiator and the second radiator to the feeding unit. Therefore, the adjustment range of the main radiation direction of the antenna is enlarged.

In an optional implementation, the tuning unit includes at least one switch. The switch is disposed among the feeding unit, the first radiator, the second radiator, and the third radiator, and the switch is configured to selectively connect the feeding unit to at least one radiator of the first radiator, the second radiator, and the third radiator. Alternatively, the switch is disposed among the first radiator, the second radiator, the third radiator, and the ground plane, and the switch is configured to selectively connect the ground plane to at least one radiator of the first radiator, the second radiator, and the third radiator. Therefore, using the switch as the tuning unit ensures a simple structure and facilitates switching.

In an optional implementation, the tuning unit includes at least one tunable capacitor. The tunable capacitor is connected in series between the feeding unit and the feeding coupling structure, or is connected in series between the grounding coupling structure and the ground plane. When a capacitance value of the tunable capacitor is a preset threshold, a resonance frequency is in a first frequency band, where the first frequency band is an operating frequency band of the antenna unit. Alternatively, when a capacitance value of the tunable capacitor is less than a preset threshold, a resonance frequency is outside a first frequency band. Therefore, using the tunable capacitor as the tuning unit makes a control manner more flexible.

In an optional implementation, the third end of the second radiator is connected to a connection point on the first radiator. The connection point on the first radiator is located between the first end and the second end. Therefore, connection/disconnection of each tuning unit may be adjusted to implement switching between the differential mode and the common mode of the radiator. This can flexibly adjust the main radiation direction of the antenna unit to reduce the impact of gripping by the user on the antenna radiation performance.

In an optional implementation, the antenna unit is a patch antenna. The antenna unit includes a first edge portion and a second edge portion that intersect. The first edge portion of the antenna unit is used as the first radiator. The second edge portion of the antenna unit is used as the second radiator. One end of the first edge portion and one end of the second edge portion that intersect each are coupled to the feeding unit. The other end of the first edge portion and the other end of the second edge portion each are coupled to the ground plane. Therefore, using the patch antenna as the antenna unit saves more space occupied by the antenna unit.

In an optional implementation, the antenna unit further includes at least one capacitive element. The capacitive element is disposed among the feeding unit, the first radiator, the second radiator, and the third radiator. The feeding unit is coupled to at least one radiator of the first radiator, the second radiator, and the third radiator through the capacitive element. Therefore, a high-frequency signal outside the operating frequency band may be filtered out through the capacitive element.

A second aspect of this application provides a communication device, including a radio frequency module and the foregoing antenna unit. The radio frequency module is electrically connected to an antenna. Therefore, the communication device uses the foregoing antenna unit, and a main radiation direction of the antenna unit may be flexibly adjusted to reduce impact of gripping by a user on antenna radiation performance.

In an optional implementation, the communication device includes a rear housing. At least one radiator of the antenna unit is disposed on the rear housing. Therefore, space on a housing is larger, and a plurality of radiators at different angles may be disposed to implement radiation pattern coverage in a plurality of directions in a same frequency band.

In an optional implementation, the housing is made of glass or ceramic.

In an optional implementation, the communication device further includes a middle frame. The middle frame includes a bearing plate and a frame around the bearing plate. At least one radiator of the antenna unit is disposed on the frame. Therefore, a structure of an existing frame antenna can be improved, and design flexibility of the antenna unit can be improved.

In an optional implementation, a printed circuit board PCB is disposed on the bearing plate. The feeding unit, the ground plane, and the tuning unit are disposed on the PCB. The feeding coupling structure is electrically connected to the feeding unit. The grounding coupling structure is electrically connected to the ground plane.

DESCRIPTION OF EMBODIMENTS

Figure 1A:
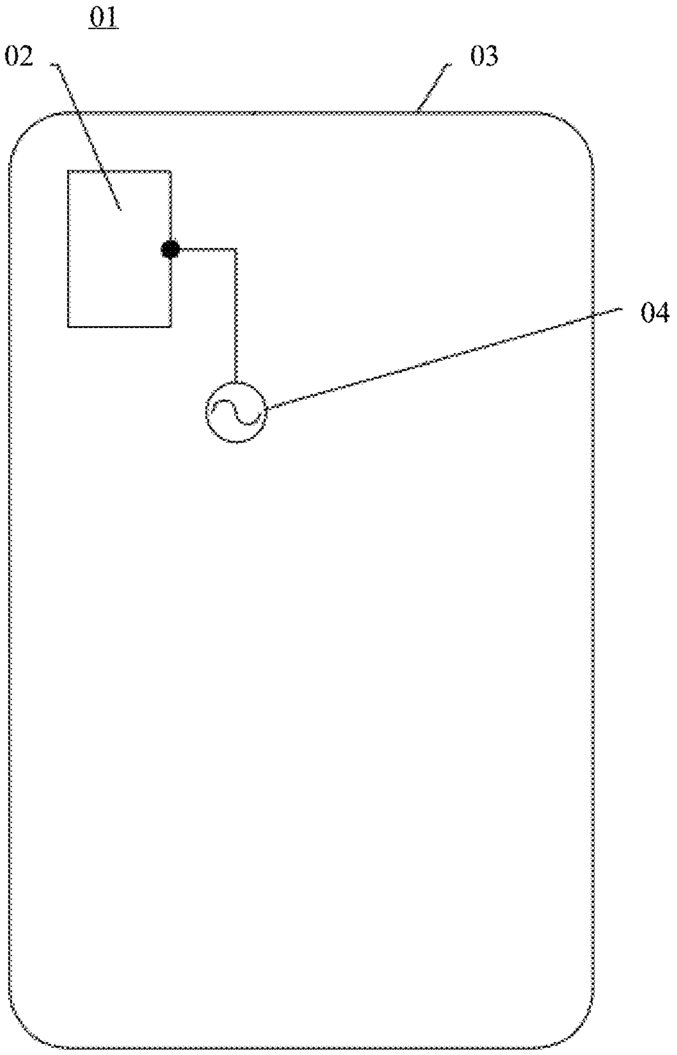
FIG. 1*a* is a schematic diagram depicting a structure of a communication device according to an embodiment of this application.

To make objectives, technical solutions, and advantages of this application clearer, the following further describes this application in detail with reference to the accompanying drawings.

The terms "first", "second", and the like mentioned below are merely intended for a purpose of description, and shall not be understood as an indication or implication of relative importance or implicit indication of the number of indicated technical features. Therefore, a feature limited by "first", "second", or the like may explicitly or implicitly include one or more features. In the descriptions of this application, unless otherwise stated, "a plurality of" means two or more than two.

In addition, in this application, orientation terms such as "upper" and "lower" are defined relative to orientations of schematic placement of components in the accompanying drawings. It should be understood that these directional terms are relative concepts for relative description and clarification, and may be correspondingly changed according to changes of the orientations in which the components are placed in the accompanying drawings.

The following explains terms that may appear in embodiments of this application.

Electrical connection: It may be understood as that components are in physical contact and electrically conductive, or may be understood as that different components in a line structure are connected by using a physical line capable of transmitting an electrical signal, such as a PCB copper foil or a conducting wire. The "connection" refers to a connection of a mechanical structure and a physical structure.

Coupling: It is a phenomenon that inputs and outputs of two or more circuit components or electrical networks closely cooperate with each other and affect each other, and energy is transmitted from one side to the other side through interaction.

Connection: Conduction or interconnection of two or more components in the foregoing "electrical connection" or "coupling" manner to perform signal/energy transmission may be referred to as connection.

Antenna pattern: also referred to as a radiation pattern. It is a pattern in which relative field strength (normalized modulus value) of an antenna radiation field varies with the direction at a specific distance from an antenna. Generally, the pattern is represented by two plane patterns that are perpendicular to each other in a maximum radiation direction of the antenna.

An antenna pattern usually has a plurality of radiation beams. The radiation beam with the highest radiation intensity is referred to as a main lobe, and the other remaining radiation beams are referred to as minor lobes or side lobes. In the minor lobes, the minor lobe in an opposite direction of the main lobe is also referred to as a back lobe.

Antenna directivity: It indicates a ratio of a power density of an antenna at a remote point in a maximum radiation direction to a power density of a non-directional antenna with same radiated power at the same point, and is expressed as D.

Antenna return loss: It may be understood as a ratio of power of a signal reflected back to an antenna port by an antenna circuit to a transmit power of the antenna port. The poorer the reflected signal is, the stronger a signal radiated by an antenna to space is, and the higher antenna radiation efficiency is. The stronger the reflected signal is, the poorer the signal radiated by the antenna to the space is, and the lower the antenna radiation efficiency is.

The antenna return loss may be represented by an S11 parameter. The S11 parameter is usually a negative number. A smaller value of the S11 parameter indicates a lower antenna return loss and higher antenna radiation efficiency. A larger value of the S11 parameter indicates a higher antenna return loss and lower antenna radiation efficiency.

Antenna system efficiency: It refers to a ratio of power radiated by an antenna to space (that is, power effectively converted from an electromagnetic wave) to input power of the antenna.

Antenna radiation efficiency: It refers to a ratio of power radiated by an antenna to space (that is, power effectively converted from an electromagnetic wave) to active power input to the antenna. The active power input to the antenna=input power of the antenna−an antenna loss. The antenna loss mainly includes an ohmic loss and/or a dielectric loss of metal.

First, referring to FIG. 1*a*, FIG. 1*a* is a schematic diagram depicting a structure of a communication device 01 according to an embodiment of this application.

The communication device 01 provided in this embodiment of this application includes but is not limited to an electronic product with a wireless communication function, such as a mobile phone, a tablet computer, a computer, or a wearable device. The communication device 01 includes an antenna unit 02, a device body 03, and a radio frequency module 04.

Both the antenna unit 02 and the radio frequency module 04 are assembled on the device body 03. The radio frequency module 04 is electrically connected to the antenna unit 02, and is configured to, through a feed point, receive an electromagnetic signal from the antenna unit 02 and send an electromagnetic signal to the antenna unit 02. The antenna unit 02 radiates an electromagnetic wave according to the received electromagnetic signal or sends the electromagnetic signal to the radio frequency module 04 according to a received electromagnetic wave, so as to implement radio signal receiving and sending. The radio frequency module (RF module) 04 is a circuit capable of transmitting and/or receiving a radio frequency signal, such as a transceiver (transmitter and/or receiver, T/R).

A specific form of the communication device 01 is not specially limited in this embodiment of this application. For ease of description, the following embodiments are all described by using an example in which the communication device is a mobile phone.

Figure 1B:
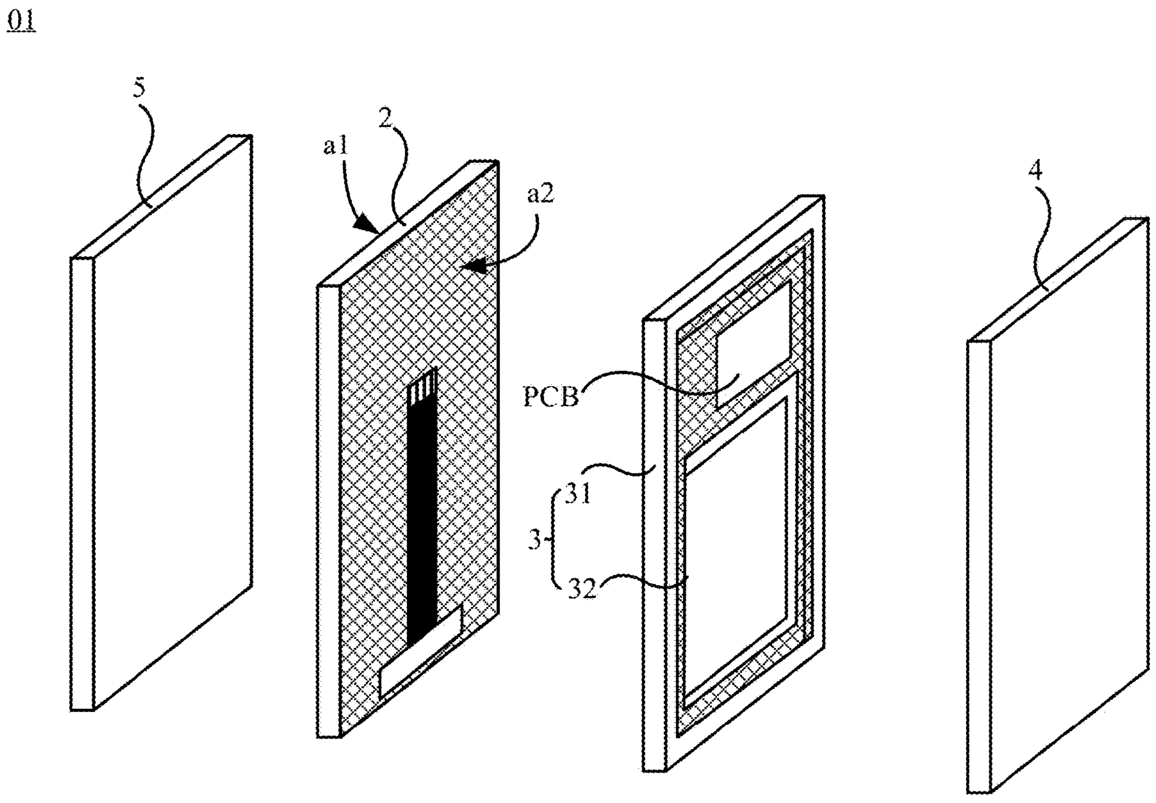
FIG. 1B is a schematic exploded view of a structure of a communication device according to an embodiment of this application.

As shown in FIG. 1B, the communication device 01 includes a display screen 2, a middle frame 3, a housing (or referred to as a battery cover or a rear housing) 4, and a cover 5.

The display screen 2 has a display surface a1 on which a display picture can be seen and a back surface a2 disposed opposite to the display surface a1. The back surface a2 of the display screen 2 is close to the middle frame 3. The cover 5 is disposed on the display surface a1 of the display screen 2.

In a possible embodiment of this application, the display screen 2 is an organic light emitting diode (OLED) display screen. An electroluminescent layer is disposed in each light emitting subpixel in the OLED display screen, so that the OLED display screen may implement self-illumination after receiving a working voltage.

In some other embodiments of this application, the display screen 2 may be a liquid crystal display (LCD). In this case, the communication device 01 may further include a back light unit (BLU) configured to provide a light source for the liquid crystal display.

The cover 5 is located on a side, away from the middle frame 3, of the display screen 2. The cover 5 may be, for example, cover glass (CG) or a transparent ceramic material. The cover glass may have specific toughness.

The rear housing 4 may be made of a material the same as that of the cover plate 5.

The middle frame 3 is located between the display screen 2 and the rear housing 4. The middle frame 3 includes a bearing plate 31 and a frame 32 around the bearing plate 31. A surface, away from the display screen 2, of the middle frame 3 is used to mount internal components such as a battery, a printed circuit board (PCB), a camera, and an antenna. After the rear housing 4 and the middle frame 3 are closed, the internal components are located between the rear housing 4 and the middle frame 3.

In some embodiments, when the frame 32 of the middle frame 3 is made of a metal material, a part of the frame 32 may be used as a part of the antenna. However, due to limitations on a shape and a size of the frame 32, an angle of the antenna disposed on the frame 32 cannot be adjusted, and a radiation pattern of the antenna is fixed, and it is difficult to meet requirements in all of a plurality of application scenarios, for example, application scenarios of gripping in a landscape mode and gripping in a portrait mode.

Figure 2A:
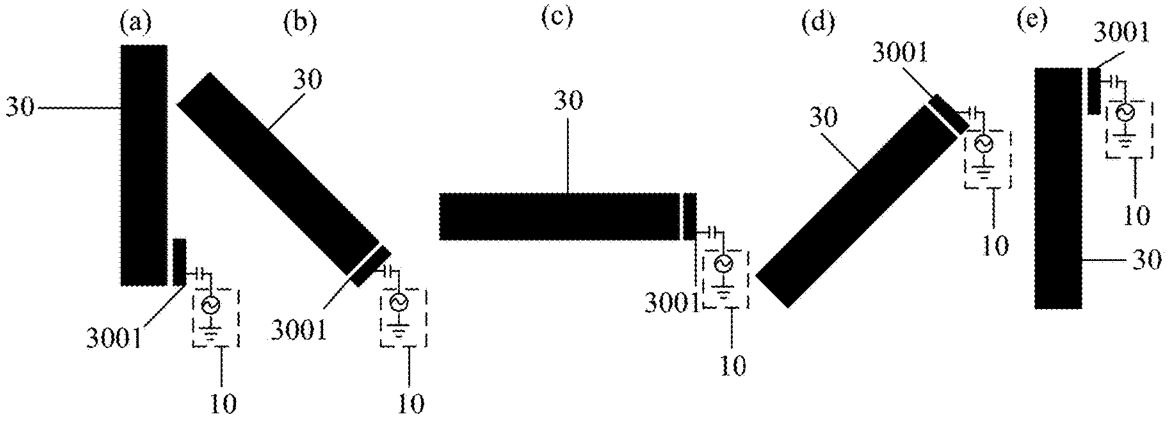
FIG. 2*a* is a schematic diagram of a rotation process of an antenna unit according to an embodiment of this application.
Figure 2B:
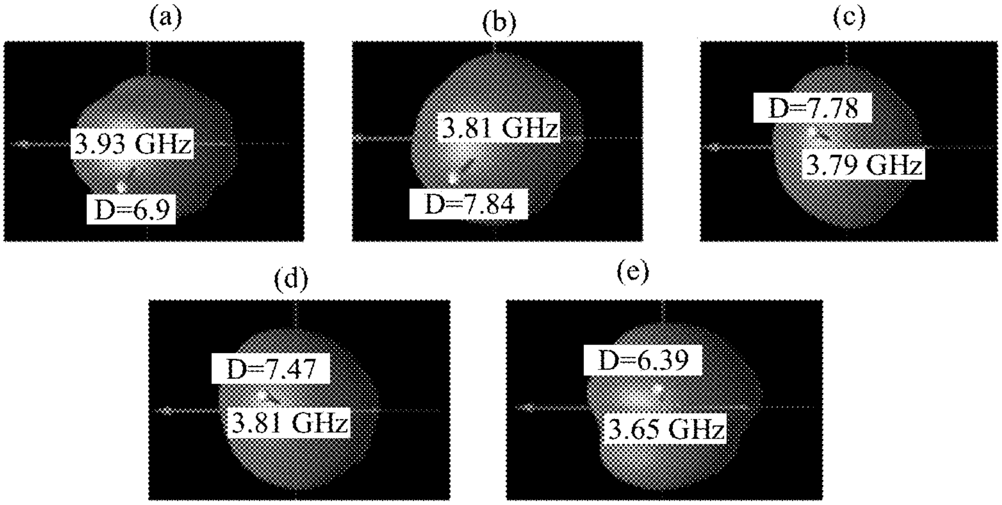
FIG. 2*b* is a simulation diagram of a radiation direction of each antenna unit in FIG. 2*a;*
Figure 2C:
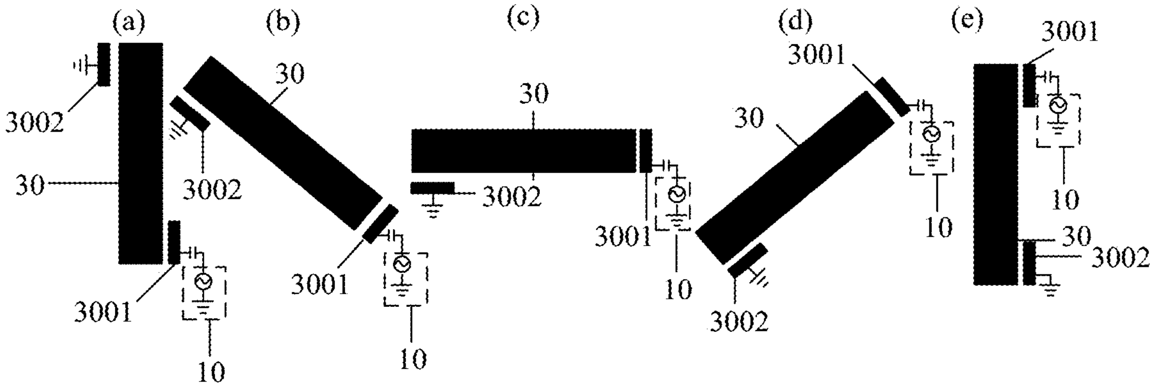
FIG. 2*c* is a schematic diagram of a rotation process of another antenna unit according to an embodiment of this application.

In some embodiments, as shown in FIG. 2*a* and FIG. 2*c*, the antenna unit includes at least one radiating element 30 and a feeding unit 10. For example, the radiating element 30 is disposed on the rear housing 4. The rear housing 4 is relatively large, so that a main radiation direction of the antenna unit can be changed by adjusting a position and an angle of the radiating element 30. Therefore, an angle of a radiator may be adjusted as required in different usage scenarios to meet a requirement of a user for gripping in a landscape mode and gripping in a portrait mode.

The main radiation direction of the antenna unit is a direction with a greatest directivity in a radiation pattern of the antenna unit.

The feeding unit 10 and a ground plane are generally disposed on the bearing plate 31 of the middle frame 3 of the device body, and the radiating element 30 disposed on the rear housing 4 cannot be directly electrically connected to the feeding unit 10 and the ground plane. Therefore, for example, the antenna unit further includes a feeding coupling structure 3001 and a grounding coupling structure 3002. The feeding coupling structure 3001 and the grounding coupling structure 3002 may be made of a material the same as that of the radiating element 30. The feeding coupling structure 3001 may be electrically connected to the feeding unit 10, and is coupled to the radiating element 30. The grounding coupling structure 3002 may be electrically connected to the ground plane, and is coupled to the radiating element 30.

During operation, the feeding unit 10 may feed the radiating element 30 in a coupling manner through the feeding coupling structure, and the radiating element 30 may be electrically connected to the ground plane through the grounding coupling structure.

With reference to FIG. 2*a* and FIG. 2*b*, the radiating element 30 includes a first end and a second end that are opposite to each other. A feeding coupling structure 3001 is disposed at the first end of the radiating element 30. The feeding unit 10 is configured to feed the radiating element 30 in a coupling manner through the feeding coupling structure 3001.

When the radiating element 30 is rotated as shown in (a) to (e) in FIG. 2*a*, a radiation pattern of the radiating element 30 is shown in (a) to (e) in FIG. 2*b*, and the radiating element 30 may be rotated accordingly. A simulation diagram of radiation directions of the antenna unit at different angles is shown in FIG. 2*b*.

D in FIG. 2*b* is a directivity of a direction to which an arrow points, and the directivity of the direction to which the arrow points is the greatest. As shown in FIG. 2*b*, from (a) to (e), a main radiation direction of the radiator deflects from bottom to top, and a deflection angle is about 50° to 60°. The main radiation direction may be the direction with the greatest directivity.

When the radiating element 30 is vertically placed, a directivity is the smallest.

Therefore, main radiation directions are different when the antenna unit resonates at different angles.

Figure 2D:
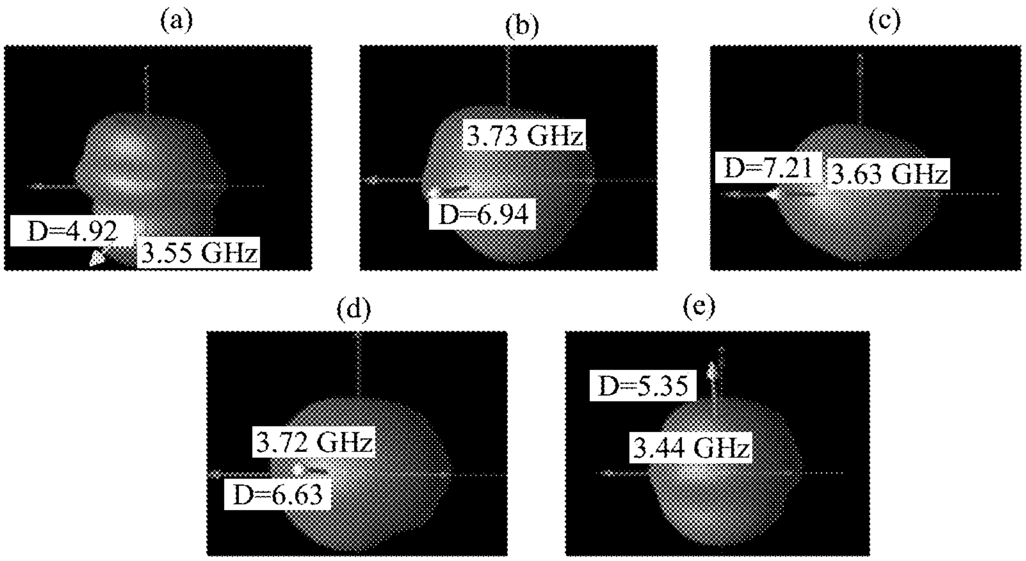
FIG. 2*d* is a simulation diagram of a radiation direction of each antenna unit in FIG. 2*c;*

It should be noted that, in an ideal environment, a resonance frequency of the antenna unit remains unchanged in a rotation process, and main radiation directions of the antenna unit with the same resonance frequency at different angles may be obtained through simulation. However, in this application, a simulation result of the radiation pattern of the antenna unit is obtained through simulation in a real environment. Under impact of an external environment, resonance frequencies of the antenna unit at different angles in FIG. 2*d* are different, and there are some errors. The simulation result is for reference only.

As shown in FIG. 2*c* and FIG. 2*d*, based on FIG. 2*a*, a grounding coupling structure 3002 is further disposed at the second end of the radiating element 30. The grounding coupling structure 3002 is grounded and coupled to the radiating element 30. The radiating element 30 is electrically connected to the ground plane through the grounding coupling structure 3002.

When the radiating element 30 is rotated as shown in (a) to (e) in FIG. 2*c*, a radiation pattern of the radiating element 30 is shown in (a) to (e) in FIG. 2*d*, and the radiating element 30 may be rotated accordingly. A simulation diagram of radiation directions of the antenna unit at different angles is shown in FIG. 2*d*.

D in FIG. 2*d* is a directivity of a direction to which an arrow points, and the directivity of the direction to which the arrow points is the greatest. As shown in FIG. 2*d*, from (a) to (e), the main radiation direction of the radiator deflects from bottom to top, and a deflection angle is greater than 90°.

In this embodiment, the second end of the radiating element 30 is grounded in a coupling manner, and the directivity decreases as a whole. When the radiating element 30 is rotated, a rotation angle of the radiation pattern of the radiating element 30 is larger.

Main radiation directions are different when the radiating element 30 resonates at different angles. Therefore, the main radiation direction of the antenna unit may be changed by adjusting the angle of the radiating element 30. In addition, when the radiating element 30 is grounded in a coupling manner, and the angle of the radiator is changed, the main radiation direction is changed more greatly. Therefore, the main radiation direction of the antenna unit may also be changed by adjusting a structure of the radiating element 30 to ground the radiating element in a coupling manner.

In the foregoing embodiment, the main radiation direction of the antenna unit may be changed by adjusting the angle of the radiator. However, a position of an assembled antenna unit is usually fixed. Therefore, an embodiment of this application provides an improved antenna unit.

Figure 3A:
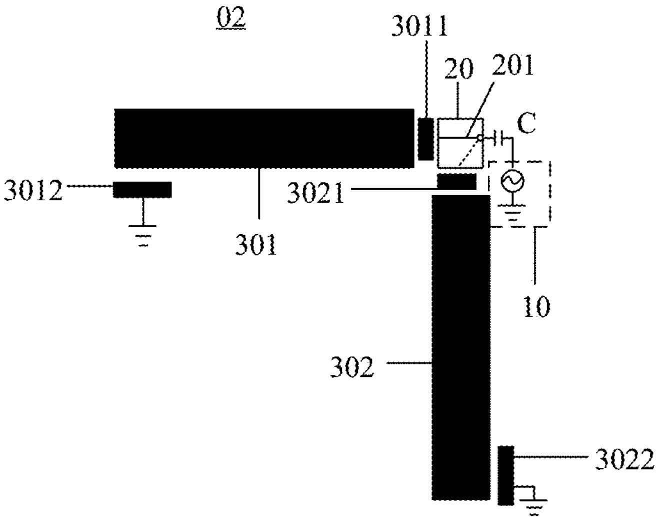
FIG. 3*a* is a schematic diagram depicting a structure of an antenna unit according to an embodiment of this application.

Then, referring to FIG. 3*a*, FIG. 3*a* is a schematic diagram depicting a structure of an antenna unit according to an embodiment of this application. As shown in FIG. 3*a*, the antenna unit 02 includes a feeding unit 10, a ground plane (not shown in the figure), a tuning unit 20, and at least two radiators.

As shown in FIG. 3*a*, there are two radiators: a first radiator 301 and a second radiator 302. The first radiator 301 includes a first end and a second end that are opposite to each other.

The second radiator 302 includes a third end and a fourth end that are opposite to each other. The fourth end is disposed away from the first end relative to the third end.

The feeding unit 10 is configured to feed the first radiator 301 and the second radiator 302, at the first end of the first radiator 301 and the third end of the second radiator 302.

The second end of the first radiator 301 or a middle position of the first radiator 301 is connected to the ground plane. The fourth end of the second radiator 302 or a middle position of the second radiator 302 is connected to the ground plane.

It should be noted that a middle position of a radiator is between two ends of the radiator. For example, distances from the middle position to the two ends of the radiator are equal.

The tuning unit 20 is configured to selectively connect the feeding unit 10 to the first end of the first radiator 301 to feed the first radiator 301, and selectively connect the feeding unit 10 to the third end of the second radiator 302 to feed the second radiator 302.

The antenna unit has different main radiation directions when the tuning unit 20 connects the feeding unit 10 to only the first radiator 301 and when the tuning unit 20 connects the feeding unit 10 to only the second radiator 302 are different.

The main radiation direction of the antenna unit is a direction with a greatest directivity in a radiation pattern of the antenna unit.

According to the antenna unit provided in this embodiment of this application, main radiation directions of radiators are different. In this embodiment of this application, a plurality of different radiators (different in angle and/or different in structure) are disposed, and the tuning unit connects the feeding unit to different radiators, so as to implement radiation pattern coverage in a plurality of directions in a same frequency band. Therefore, the main radiation direction of the antenna unit may be flexibly selected according to different gripping positions of a user in different usage scenarios to reduce impact of gripping by the user on antenna radiation performance.

When the ground plane is close to the second end of the first radiator or the fourth end of the second radiator, an operating mode of the radiator is a differential mode, or when the ground plane is close to the middle position of the radiator, an operating mode of the radiator is a common mode. In the differential mode and the common mode, the radiator has different main radiation directions. The main radiation direction of the antenna unit may be flexibly adjusted by switching between the differential mode and the common mode of the radiator, thereby reducing the impact of gripping by the user on the antenna radiation performance.

In some embodiments of this application, angles of the first radiator 301 and the second radiator 302 are different. An included angle between an extension direction of the first radiator 301 at the first end and an extension direction of the second radiator 302 at the third end is a first angle. For example, the first angle ranges from 60° to 120°. As shown in FIG. 3*a*, the first angle is 90°.

In some embodiments of this application, the feeding unit 10 is configured to be electrically connected to the first radiator 301 or the second radiator 302. It should be noted that electrical connection in this embodiment is that the feeding unit 10 and the first radiator 301 or the second radiator 302 are in physical contact and electrically conductive.

When the tuning unit 20 connects the feeding unit 10 to the first end of the first radiator 301, the main radiation direction of the antenna unit is a first direction. When the tuning unit 20 connects the feeding unit 10 to the third end of the second radiator 302, the main radiation direction of the antenna unit is a second direction. An included angle between the first direction and the second direction is a second angle.

Therefore, different angles between the first radiator 301 and the second radiator 302 result in different main radiation directions of the first radiator 301 and the second radiator 302.

In some other embodiments of this application, as shown in FIG. 3*a*, the antenna unit further includes a first feeding coupling structure 3011 and a first grounding coupling structure 3012 that are coupled to the first radiator 301, as well as a second feeding coupling structure 3021 and a second grounding coupling structure 3022 that are coupled to the second radiator 302.

The first feeding coupling structure 3011 is disposed between the first end of the first radiator 301 and the feeding unit 10. The first grounding coupling structure 3012 is disposed between the second end of the first radiator 301 and the ground plane. The feeding unit 10 is electrically connected to the first feeding coupling structure 3011. The feeding unit 10 is configured to feed the first radiator 301 in a coupling manner through the first feeding coupling structure 3011. The first grounding coupling structure 3012 is electrically connected to the ground plane. The first radiator 301 is grounded through the first grounding coupling structure 3012.

Correspondingly, the second feeding coupling structure 3021 is disposed between the third end of the second radiator 302 and the feeding unit 10. The second grounding coupling structure 3022 is disposed between the fourth end of the second radiator 302 and the ground plane. The feeding unit 10 is electrically connected to the second feeding coupling structure 3021. The feeding unit 10 is configured to feed the second radiator 302 in a coupling manner through the second feeding coupling structure 3021. The second grounding coupling structure 3022 is electrically connected to the ground plane. The second radiator 302 is grounded through the second grounding coupling structure 3022.

When the feeding unit 10 feeds the first radiator 301 through the first feeding coupling structure 3011, the main radiation direction of the antenna unit is a third direction. When the feeding unit 10 feeds the second radiator 302 through the second feeding coupling structure 3021, the main radiation direction of the antenna unit is a fourth direction. An included angle between the third direction and the fourth direction is a third angle. The third angle is greater than the second angle.

Therefore, a coupled feeding mode is used to facilitate placement of an antenna away from the ground plane. In addition, the grounding coupling structures and the feeding coupling structures are disposed, so that an angle between the main radiation direction in a radiation pattern of the first radiator 301 and the main radiation direction in a radiation pattern of the second radiator 302 may be enlarged by disposing the grounding coupling structures and the feeding coupling structures.

A quantity of feeding coupling structures is not limited in this embodiment of this application. In some embodiments of this application, as shown in FIG. 3*a*, there are a plurality of feeding coupling structures: the first feeding coupling structure 3011 and the second feeding coupling structure 3021.

The first feeding coupling structure 3011 is coupled to the first radiator 301. The second feeding coupling structure 3021 is coupled to the second radiator 302. The tuning unit 20 is disposed between the feeding unit 10 and the feeding coupling structure. The feeding unit is electrically connected to the feeding coupling structure through the tuning unit 20. In this case, switching between different radiation modes may be implemented by controlling connection/disconnection of the feeding unit.

Figure 3B:
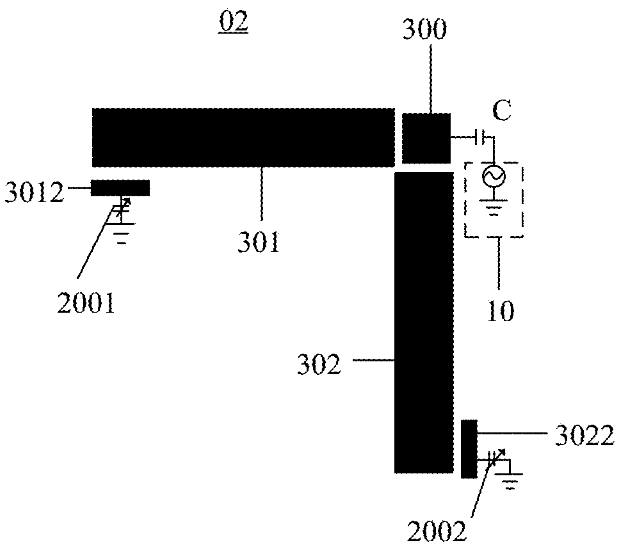
FIG. 3*b* is a schematic diagram depicting a structure of another antenna unit according to an embodiment of this application.

In some other embodiments of this application, as shown in FIG. 3*b*, the first radiator 301 and the second radiator 302 share one distributed feeding coupling structure 300. Each of the first radiator 301 and the second radiator 302 is coupled to one edge of the distributed feeding coupling structure 300. The tuning unit 20 is disposed between the grounding coupling structure 300 and the ground plane. The grounding coupling structure is electrically connected to the ground plane through the tuning unit. In this case, a plurality of radiators share one feeding coupling structure, so that more space is saved, and miniaturization of the antenna is facilitated.

A specific form of the tuning unit 20 is not limited in this embodiment of this application. In some embodiments of this application, as shown in FIG. 3*a*, for example, the tuning unit 20 includes at least one switch 201. The switch 201 is disposed among the feeding unit 10, the first radiator 301, and the second radiator 302, and the switch is configured to selectively connect the feeding unit 10 to at least one radiator of the first radiator 301 and the second radiator 302.

Alternatively, the switch 201 is disposed among the first radiator 301, the second radiator 302, and the ground plane, and the switch 201 is configured to selectively connect the ground plane to at least one radiator of the first radiator 301 and the second radiator 302.

The switch 201 is configured to control a connected state between the feeding unit 10 and the first radiator 301 and between the feeding unit 10 and the second radiator 302.

In an implementation, the switch 201 is a PIN diode. In another implementation, the switch 201 may alternatively be a MEMS switch or a photoelectric switch.

The switch 201 includes, for example, a first end and a second end that are opposite to each other. The first end of the switch 201 is connected to the feeding unit 10. The second end of the switch 201 is configured to be connected to the first radiator 301 or be connected to the second radiator 302.

When the second end of the switch 201 is connected to the first feeding coupling structure 3011, the feeding unit 10 is connected to the first radiator 301, the feeding unit 10 is disconnected from the second radiator 302, and the antenna unit operates in a first radiation mode.

When the second end of the switch 201 is connected to the second feeding coupling structure 3021, the feeding unit 10 is connected to the second radiator 302, the feeding unit 10 is disconnected from the first radiator 301, and the antenna unit operates in a second radiation mode.

Therefore, using the switch as the tuning unit ensures a simple structure and facilitates switching.

In some other embodiments of this application, the switch is disposed between the radiator and the ground plane. The first end of the switch is connected to the ground plane. The second end of the switch is configured to be connected to one of the radiators.

In some other embodiments of this application, as shown in FIG. 3*b*, the first radiator 301 and the second radiator 302 share one distributed feeding coupling structure 300. The feeding unit feeds two or more radiators in a coupling manner through the one distributed feeding coupling structure 300. The first radiator 301 and the second radiator 302 are separately parallel to one edge of the distributed feeding coupling structure 300.

In this case, a plurality of radiators share one distributed feeding coupling structure 300, so that more space is saved, and miniaturization of the antenna is facilitated.

Based on this, the tuning unit 20 includes, for example, at least one tunable capacitor. The tunable capacitor is connected in series between the feeding unit and the radiator, or is connected in series between the radiator and the ground plane.

When a capacitance value of the tunable capacitor is a preset threshold, a resonance frequency is in a first frequency band, the feeding unit is connected to the radiator, and the antenna unit operates in the first radiation mode.

It should be noted that the first frequency band is an operating frequency band of the antenna unit. In some embodiments of this application, the first frequency band is an N78 (3.3 GHz to 3.7 GHz) frequency band.

When a capacitance value of the tunable capacitor is less than a preset threshold, a resonance frequency is outside a first frequency band, the feeding unit is disconnected from the radiator, and the antenna unit operates in the second radiation mode.

As shown in FIG. 3*b*, the first radiator 301 is connected in series to a first tunable capacitor 2011, and the second radiator 302 is connected in series to a second tunable capacitor 2002.

In some embodiments of this application, the tunable capacitor is connected in series between the feeding unit 10 and the first feeding coupling structure 3011 and between the feeding unit 10 and the second feeding coupling structure 3021. The tunable capacitor is configured to adjust the resonance frequency.

In some other embodiments of this application, the tunable capacitor may be disposed between the ground plane and the coupling structure. The tunable capacitor is configured to adjust a resonance frequency of the first tunable capacitor 2001.

As shown in FIG. 3*b*, the first tunable capacitor 2001 is connected in series between the first grounding coupling structure 3012 and the ground plane, and the second tunable capacitor 2002 is connected in series between the second grounding coupling structure 3022 and the ground plane. Capacitance values of the first tunable capacitor 2001 and the second tunable capacitor 2002 are adjustable. The capacitance values of the first tunable capacitor 2001 and the second tunable capacitor 2002 are adjustable for adjusting the resonance frequency.

During operation, when the capacitance value of the first tunable capacitor 2001 is the preset threshold and the capacitance value of the second tunable capacitor 2002 is less than the preset threshold, the resonance frequency of the first tunable capacitor 2001 is in the first frequency band, and the first tunable capacitor 2001 resonates and is in a low-resistance state. In this case, the first tunable capacitor is similar to a conductor, and the feeding unit 10 is conductively connected to the first radiator 301.

When an electromagnetic wave whose frequency is in the first frequency band is transmitted to the second tunable capacitor 2002, the second tunable capacitor 2002 does not resonate and is in a high-resistance state, because a resonance frequency of the second tunable capacitor 2002 is outside the first frequency band. In this case, the second tunable capacitor 2002 is similar to an insulator, and the feeding unit 10 is disconnected from the second radiator 302.

In this case, the antenna unit operates in the first radiation mode.

Correspondingly, when the capacitance value of the first tunable capacitor 2001 is less than the preset threshold and the capacitance value of the second tunable capacitor 2002 is the preset threshold, the resonance frequency of the first tunable capacitor 2001 is outside the first frequency band, and the first tunable capacitor 2001 does not resonate and is in a high-resistance state. In this case, the first tunable capacitor 2001 is similar to an insulator, and the feeding unit 10 is disconnected from the first radiator 301.

In this case, when a resonance frequency of the second tunable capacitor 2002 is in the first frequency band, the second tunable capacitor 2002 resonates and is in a low-resistance state. In this case, the second tunable capacitor 2002 is similar to a conductor, and the feeding unit 10 is conductively connected to the second radiator 302.

In this case, the antenna unit operates in the second radiation mode.

Therefore, using the tunable capacitor as the tuning unit makes a control manner more flexible.

In addition, as shown in FIG. 3*a*, a capacitive element is further disposed between the feeding unit 10 and the tuning unit 20. As shown in FIG. 3*b*, the capacitive element is further disposed between the feeding unit and the distributed feeding coupling structure 300. The capacitive element may be configured to filter out a high-frequency signal outside the operating frequency band.

Figure 4:
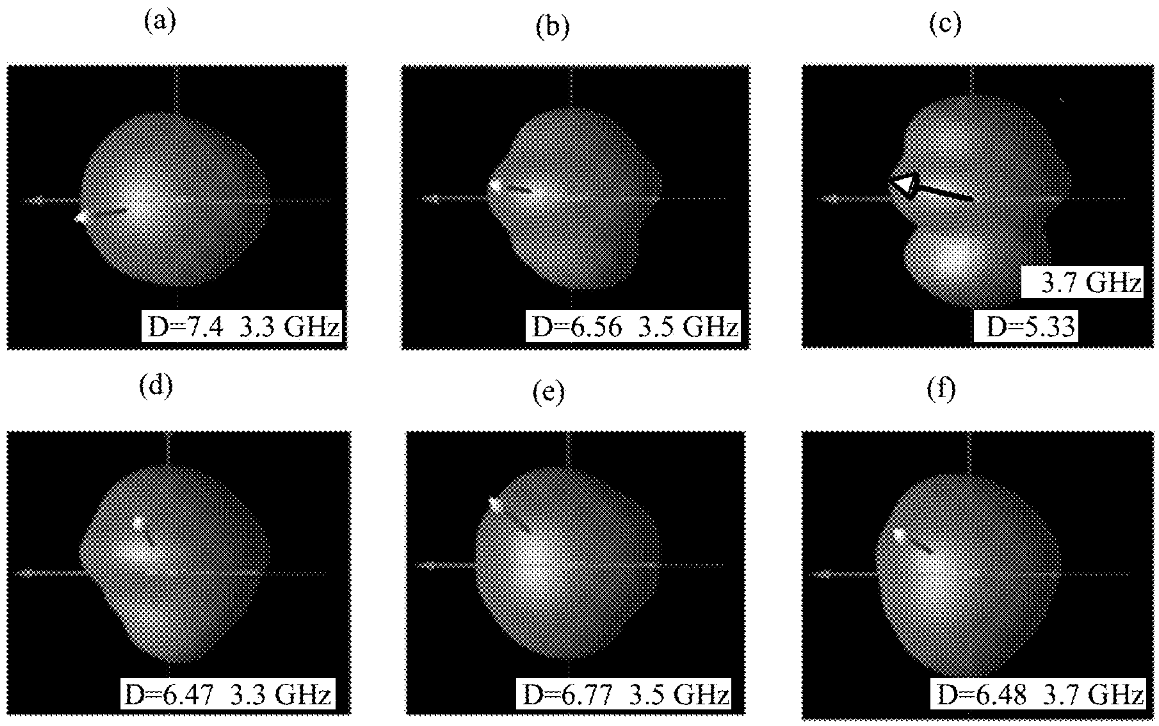
FIG. 4 is a simulation diagram of a radiation direction of the antenna unit in FIG. 3*b;*
Figure 5:
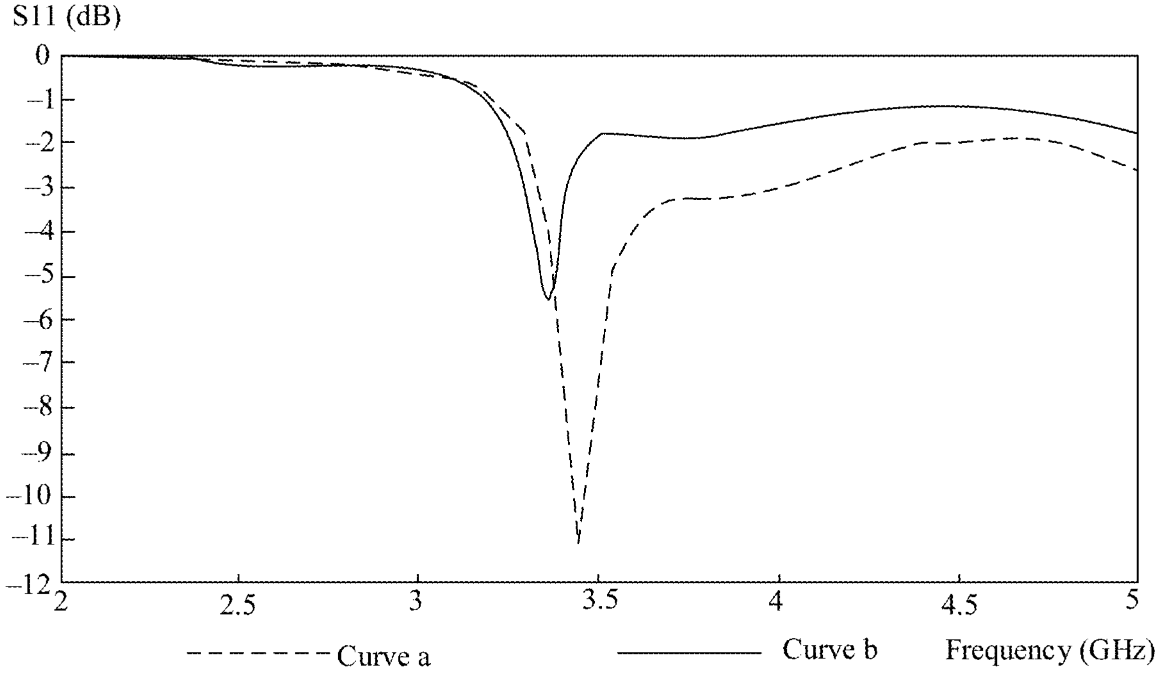
FIG. 5 is a distribution diagram of an S11 parameter of the antenna unit in FIG. 3*b;*
Figure 6:
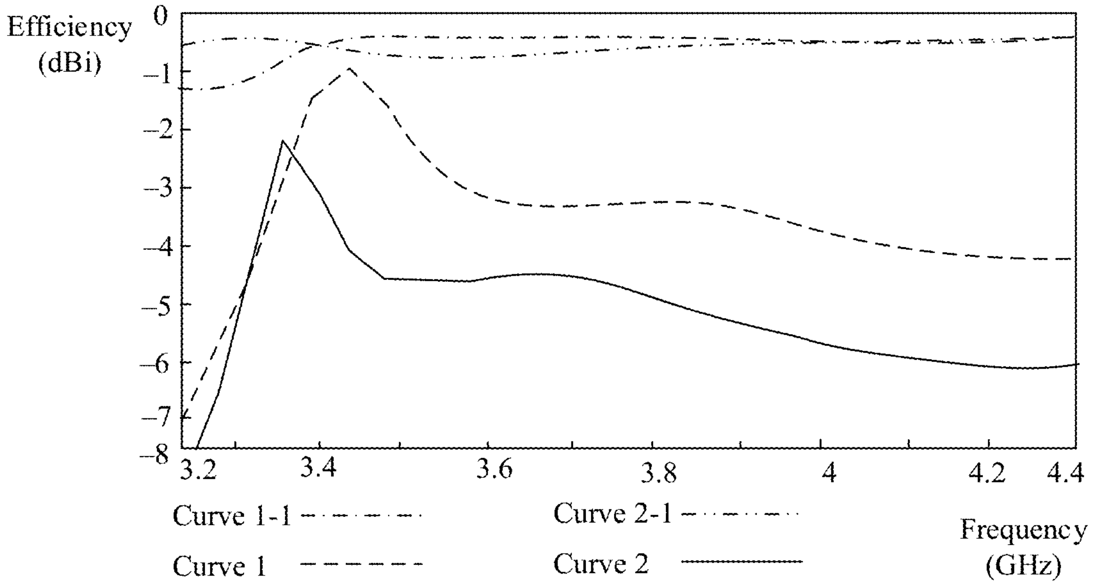
FIG. 6 is a schematic diagram of radiation efficiency of the antenna unit in FIG. 3*b;*

FIG. 4 is a simulation diagram of a radiation direction of an antenna unit according to an embodiment of this application. FIG. 5 is a distribution diagram of an S11 parameter of an antenna unit according to an embodiment of this application. FIG. 6 is a schematic diagram of antenna radiation efficiency of an antenna unit according to an embodiment of this application.

A capacitance value of the capacitive element C is 0.6 pF.

When the antenna unit operates in the first radiation mode, the capacitance value of the first tunable capacitor 2001 is, for example, 1.2 pF, and the capacitance value of the second tunable capacitor is 0.3 pF.

When the antenna unit operates in the second radiation mode, the capacitance value of the first tunable capacitor 2001 is, for example, 0.3 pF, and the capacitance value of the second tunable capacitor is 1.2 pF.

Simulation diagrams of a radiation direction of the antenna unit when the antenna unit operates in the first radiation mode are shown in (a), (b), and (c) in FIG. 4. Referring to (a), (b), and (c) in FIG. 4, when the antenna unit operating in the first radiation mode resonates in the N78 (3.3 GHz to 3.7 GHz) frequency band, the main radiation direction is the first direction.

A distribution diagram of an S11 parameter when the antenna unit operates in the first radiation mode is shown by a curve a in FIG. 5. As shown by the curve a in FIG. 5, when the antenna unit operating in the first radiation mode resonates, the S11 parameter is relatively small, and an antenna return loss is relatively low. In this case, antenna radiation efficiency is relatively high. For the antenna radiation efficiency of the antenna unit operating in the first radiation mode, refer to a curve 1 in FIG. 6. As shown by the curve 1 in FIG. 6, when the antenna unit operating in the first radiation mode resonates, the antenna radiation efficiency is relatively high.

Simulation diagrams of the radiation direction of the antenna unit when the antenna unit operates in the first radiation mode are shown in (d), (e), and (f) in FIG. 4. Referring to (d), (e), and (f) in FIG. 4, when the antenna unit operating in the second radiation mode resonates in the N78 (3.3 GHz to 3.7 GHz) frequency band, the main radiation direction is the second direction.

A distribution diagram of the S11 parameter when the antenna unit operates in the second radiation mode is shown by a curve b in FIG. 5. As shown by the curve b in FIG. 5, when the antenna unit operating in the second radiation mode resonates, the S11 parameter is relatively small, and an antenna return loss is relatively low. In this case, antenna radiation efficiency is relatively high. For the antenna radiation efficiency of the antenna unit operating in the second radiation mode, refer to a curve 2 in FIG. 6. As shown by the curve 2 in FIG. 6, when the antenna unit operating in the second radiation mode resonates, the antenna radiation efficiency is relatively high.

In addition, for antenna system efficiency of the antenna unit operating in the first radiation mode, refer to a curve 1-1 in FIG. 6. For antenna system efficiency of the antenna unit operating in the second radiation mode, refer to a curve 2-1 in FIG. 6.

Therefore, the main radiation direction of the radiator in the first radiation mode is the first direction, and the main radiation direction of the radiator in the second radiation mode is the second direction.

The first radiation mode is, for example, a landscape mode, and the second radiation mode is, for example, a portrait mode.

In the portrait mode, the user grips at vertical edges of a frame of the mobile phone. In the landscape mode, the user grips at horizontal edges of a frame of the mobile phone.

Figure 7:
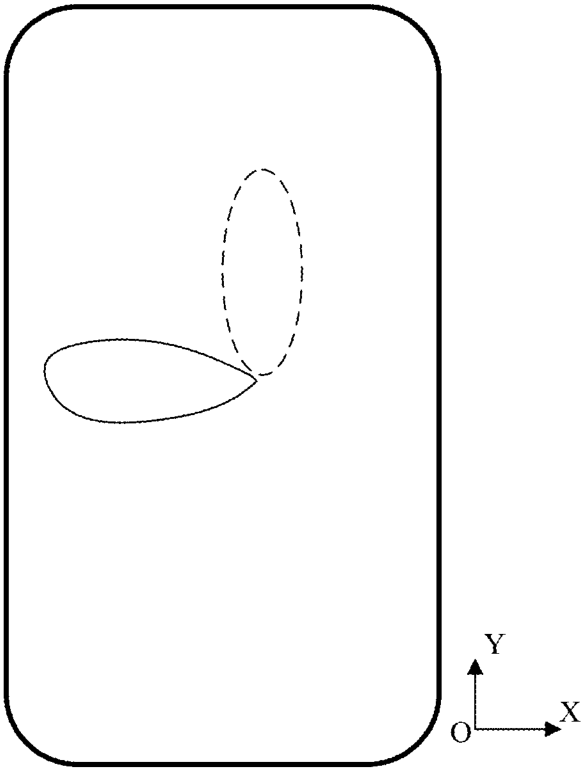
FIG. 7 is a schematic diagram of a main radiation direction of the antenna unit in FIG. 3*b;*

As shown in FIG. 7, the horizontal edge of the frame of the mobile phone is used as an X axis, and the vertical edge of the frame of the mobile phone is used as a Y axis. The first direction is, for example, a direction parallel to the X axis. The second direction is, for example, a direction parallel to the Y axis.

Therefore, in the landscape mode, the user grips at the horizontal edges of the frame of the mobile phone, and the main radiation direction of the antenna unit 02 is the first direction. This avoids the impact of gripping by the user on the antenna radiation performance.

In the portrait mode, the user grips at the vertical edges of the frame of the mobile phone, and the main radiation direction of the antenna unit 02 is the second direction. This avoids the impact of gripping by the user on the antenna radiation performance.

The included angle between the first radiator 301 and the second radiator 302 is not limited in this embodiment of this application. A larger included angle between the first radiator 301 and the second radiator 302 indicates a larger angle between the main radiation directions in the radiation patterns of the first radiator 301 and the second radiator 302.

The included angle between the first radiator 301 and the second radiator 302 may be 60° to 120°. In some embodiments of this application, the included angle between the first radiator 301 and the second radiator 302 is 90°.

In the landscape mode and the portrait mode of the mobile phone, an included angle between gripping positions of the user is 90°, and a maximum radiation included angle between the first radiator 301 and the second radiator 302 is close to 90°, so that the included angle between the main radiation directions of the first radiator 301 and the second radiator 302 is close to 90°. This can better reduce the impact of gripping the mobile phone by the user on the radiation performance.

According to the antenna unit provided in this embodiment of this application, the tuning unit 20 is disposed on the radiator of the antenna, so that the radiation direction of the antenna can be changed, and the impact of gripping by the user on the antenna radiation performance can be avoided.

Figure 8A:
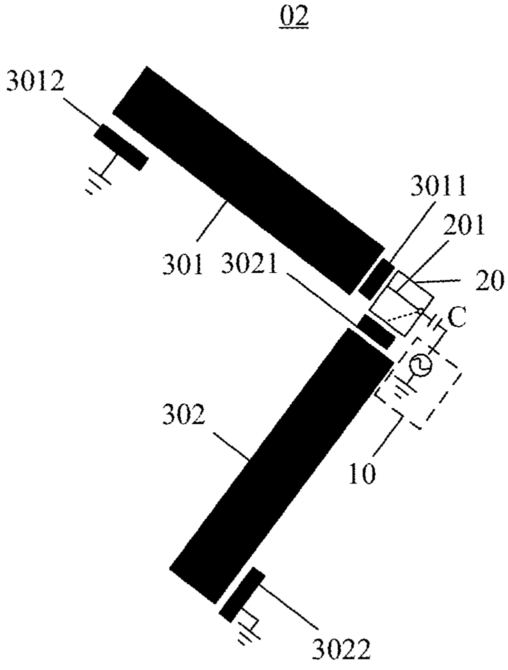
FIG. 8*a* is a schematic diagram depicting a structure of another antenna unit according to an embodiment of this application.
Figure 8B:
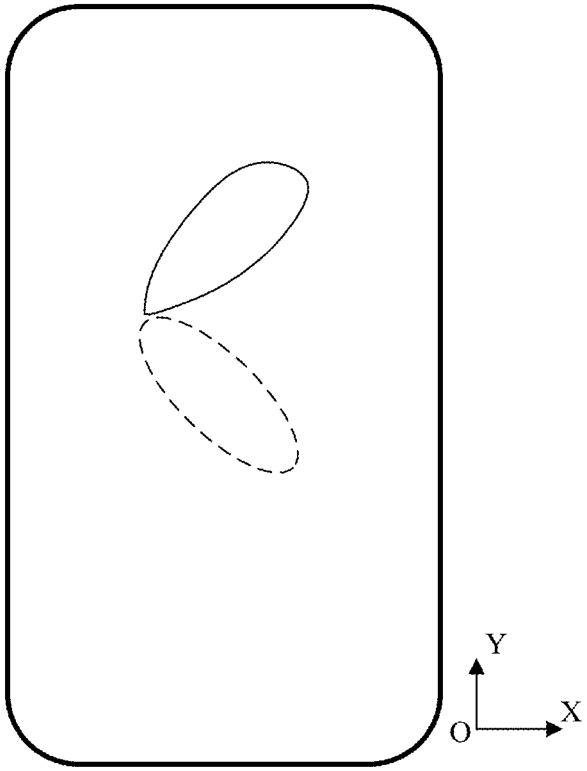
FIG. 8*b* is a schematic diagram of a main radiation direction of the antenna unit in FIG. 8*a;*

In some other embodiments of this application, as shown in FIG. 8*a*, the entire antenna unit 02 may be rotated by a preset angle. FIG. 8*b* is a schematic diagram of the main radiation direction of the antenna unit in FIG. 8*a*. As shown in FIG. 8*b*, when the antenna unit 02 rotates by the preset angle, the main radiation direction of the antenna unit 02 rotates by the preset angle accordingly.

Figure 9A:
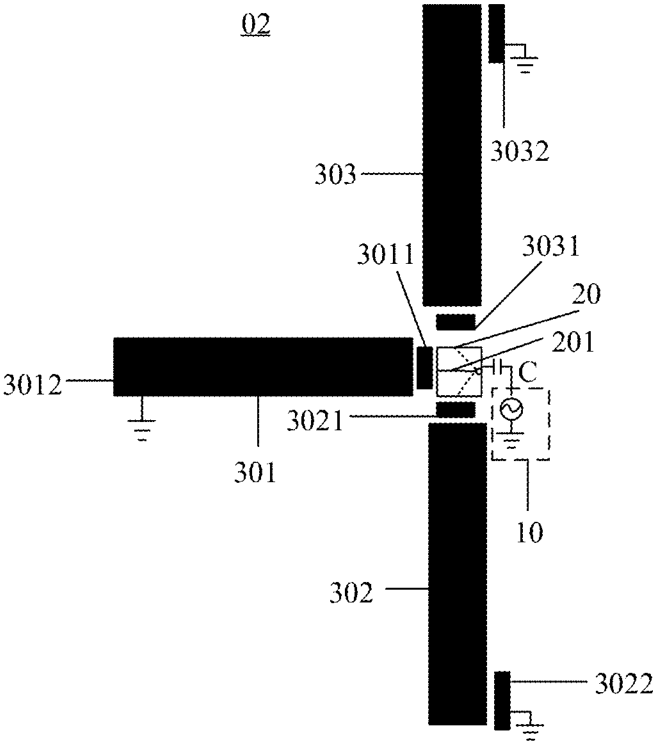
FIG. 9*a* is a schematic diagram depicting a structure of another antenna unit according to an embodiment of this application.

In some other embodiments of this application, as shown in FIG. 9*a*, the antenna unit 02 includes a first radiator 301, a second radiator 302, a third radiator 303, a feeding unit 10, and a tuning unit 20.

For specific structures of the first radiator 301, the second radiator 302, and the feeding unit 10, refer to the foregoing embodiment. Details are not described herein again.

The third radiator 303 includes a fifth end and a sixth end that are opposite to each other. The sixth end of the third radiator 303 is disposed away from the first end of the first radiator 301 relative to the fifth end.

A third feeding coupling structure 3031 is disposed between the fifth end of the third radiator 303 and the feeding unit 10. A third grounding coupling structure 3032 is disposed between the sixth end of the third radiator 303 and a ground plane. The feeding unit 10 is electrically connected to the third feeding coupling structure 3031. The feeding unit 10 is configured to feed the third radiator 303 in a coupling manner through the third feeding coupling structure 3031. The third grounding coupling structure 3032 is grounded. The second radiator 302 is grounded through the third grounding coupling structure 3032.

The third grounding coupling structure 3032 is disposed, so that directivity of the third radiator 303 can be enhanced.

An included angle between the first radiator 301 or the second radiator 302 and the third radiator 303 is a fourth angle. The fourth angle ranges from 60° to 120°.

The tuning unit 20 connects the third radiator 303 to the feeding unit 10. Alternatively, the tuning unit 20 connects one or both of the first radiator 301 and the second radiator 302 to the feeding unit 20. Alternatively, the tuning unit 20 connects all of the third radiator 303 and one or both of the first radiator 301 and the second radiator 302 to the feeding unit 20.

In some embodiments of this application, the tuning unit 20 may be a switch 201. The switch 201 includes, for example, a first end and a second end that are opposite to each other. The first end of the switch 201 is connected to the feeding unit 10. The second end of the switch 201 is configured to be connected to the first radiator 301, the second radiator 302, or the third radiator 303.

When the second end of the switch 201 is connected to the first feeding coupling structure 3011, the feeding unit 10 is connected to the first radiator 301, the feeding unit 10 is disconnected from the second radiator 302 and the third radiator 303, and the antenna unit operates in a first radiation mode.

When the second end of the switch 201 is connected to the second feeding coupling structure 3021, the feeding unit 10 is connected to the second radiator 302, the feeding unit 10 is disconnected from the first radiator 301 and the third radiator 303, and the antenna unit operates in a second radiation mode.

When the second end of the switch 201 is connected to the third feeding coupling structure 3031, the feeding unit 10 is connected to the third radiator 303, the feeding unit 10 is disconnected from the first radiator 301 and the second radiator 302, and the antenna unit operates in a third radiation mode.

In some other embodiments of this application, the tuning unit 20 includes at least one tunable capacitor. The tunable capacitor is connected in series between the feeding unit and the feeding coupling structure, or is connected in series between the grounding coupling structure and the ground plane.

When a capacitance value of the tunable capacitor is a preset threshold, a resonance frequency of the tunable capacitor is in a first frequency band, where the first frequency band is an operating frequency band of the antenna unit.

When a capacitance value of the tunable capacitor is less than a preset threshold, a resonance frequency of the tunable capacitor is outside a first frequency band.

An included angle between the first radiator 301, the second radiator 302, and the third radiator 303 is not limited in this embodiment of this application.

The included angle between the first radiator 301, the second radiator 302, and the third radiator 303 may be 120°.

In some embodiments of this application, as shown in FIG. 9*a*, the included angle between the first radiator 301, the second radiator 302, and the third radiator 303 is 90°.

Figure 9B:
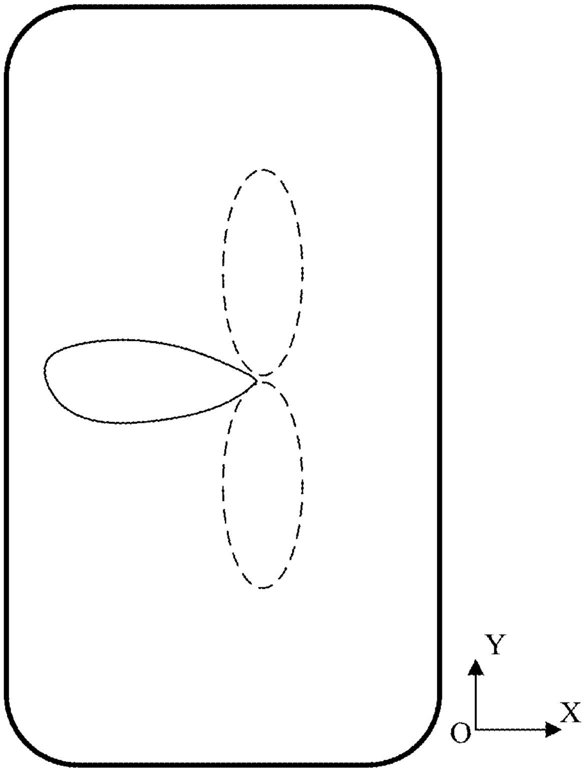
FIG. 9*b* is a schematic diagram of a main radiation direction of the antenna unit in FIG. 9*a;*

FIG. 9*b* is a schematic diagram of a main radiation direction of the antenna unit in FIG. 9*a*. As shown in FIG. 9*b*, when the antenna unit 02 includes three radiators, three main radiation directions may be selected for the antenna unit 02.

Therefore, a maximum radiation included angle between the first radiator 301 and the second radiator 302 is close to 90°, and then included angles between main radiation directions of the radiators in the first radiation mode, the second radiation mode, and the third radiation mode are close to 90°. This can better avoid the impact of gripping the mobile phone by the user on the radiation performance.

In another embodiment of this application, for example, the radiators further include a fourth radiator. The fourth radiator may be of a structure the same as that of the first radiator 301, the second radiator 302, and the third radiator 303. An included angle between the first radiator 301, the second radiator 302, the third radiator 303, and the fourth radiator may be 90°.

Figure 10:
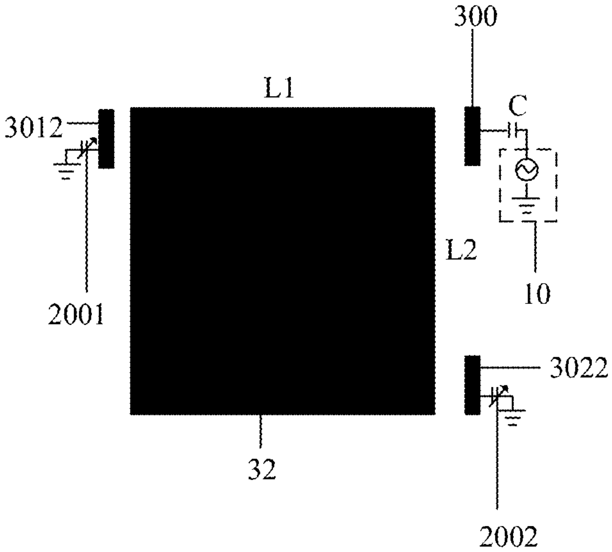
FIG. 10 is a schematic diagram depicting a structure of another antenna unit according to an embodiment of this application.

In the foregoing embodiment, there are a plurality of radiators. In some other embodiments of this application, as shown in FIG. 10, the antenna unit 02 is a patch antenna. The antenna unit 02 includes: a metal plate 32, where the metal plate 32 has a first edge L1 and a second edge L2 that intersect; a feeding unit 10; and a tuning unit 20.

A distributed feeding coupling structure 300 is disposed at a position at which the first edge L1 and the second edge L2 intersect. A first grounding coupling structure 3012 is disposed at a tail end of the first edge L1. The feeding unit 10 is electrically connected to the distributed feeding coupling structure 300. The feeding unit 10 is configured to feed the first edge L1 and the second edge L2 in a coupling manner through the distributed feeding coupling structure 300, so that the first edge and the second edge emit electromagnetic waves as radiators. Main radiation directions of the first edge and the second edge are different. The first grounding coupling structure 3012 is grounded. The first edge L1 is grounded in a coupling manner through the first grounding coupling structure 3012.

Correspondingly, a second grounding coupling structure 3022 is disposed at a second end of the second edge L2. The second grounding coupling structure 3022 is grounded. The second edge L2 is grounded in a coupling manner through the second grounding coupling structure 3022.

As shown in FIG. 10, a specific structure of the feeding unit 10 is not limited in this embodiment of this application. In some embodiments of this application, the feeding unit 10 includes a capacitive element C. The feeding unit 10 is electrically connected to the first feeding coupling structure 3011 and the first grounding coupling structure 3012 through the capacitive element C.

A first tunable capacitor 2001 is connected in series between the first grounding coupling structure 3012 and a ground plane. A second tunable capacitor 2002 is connected in series between the second grounding coupling structure 3022 and the ground plane. Capacitance values of the first tunable capacitor 2001 and the second tunable capacitor 2002 are adjustable. When the capacitance values of the first tunable capacitor 2001 and the second tunable capacitor 2002 change, resonance frequencies of the first tunable capacitor 2001 and the second tunable capacitor 2002 change accordingly.

During operation, when the capacitance value of the first tunable capacitor 2001 is greater than a preset threshold and the capacitance value of the second tunable capacitor 2002 is less than the preset threshold, the resonance frequency of the first tunable capacitor 2001 is in a first frequency band, and the first tunable capacitor 2001 resonates and is in a low-resistance state. In this case, the first tunable capacitor 2001 is similar to a conductor, and the feeding unit 10 is conductively connected to a first radiator 301.

When an electromagnetic wave whose frequency is in a second frequency band is transmitted to the second tunable capacitor 2002, the second tunable capacitor 2002 does not resonate and is in a high-resistance state, because the resonance frequency of the second tunable capacitor 2002 is outside the first frequency band. In this case, the second tunable capacitor 2002 is similar to an insulator, and the feeding unit 10 is disconnected from a second radiator 302.

In this case, the antenna unit operates in a first radiation mode.

Correspondingly, when the capacitance value of the first tunable capacitor 2001 is less than a preset threshold and the capacitance value of the second tunable capacitor 2002 is greater than the preset threshold, the resonance frequency of the first tunable capacitor 2001 is outside a first frequency band, and the first tunable capacitor 2001 does not resonate and is in a high-resistance state. In this case, the first tunable capacitor 2001 is similar to an insulator, and the feeding unit 10 is disconnected from a first radiator 301.

In this case, when the resonance frequency of the second tunable capacitor 2002 is in the first frequency band, the second tunable capacitor 2002 resonates and is in a low-resistance state. In this case, the second tunable capacitor 2002 is similar to a conductor, and the feeding unit 10 is conductively connected to a second radiator 302.

In this case, the antenna unit operates in a second radiation mode.

Figure 11:
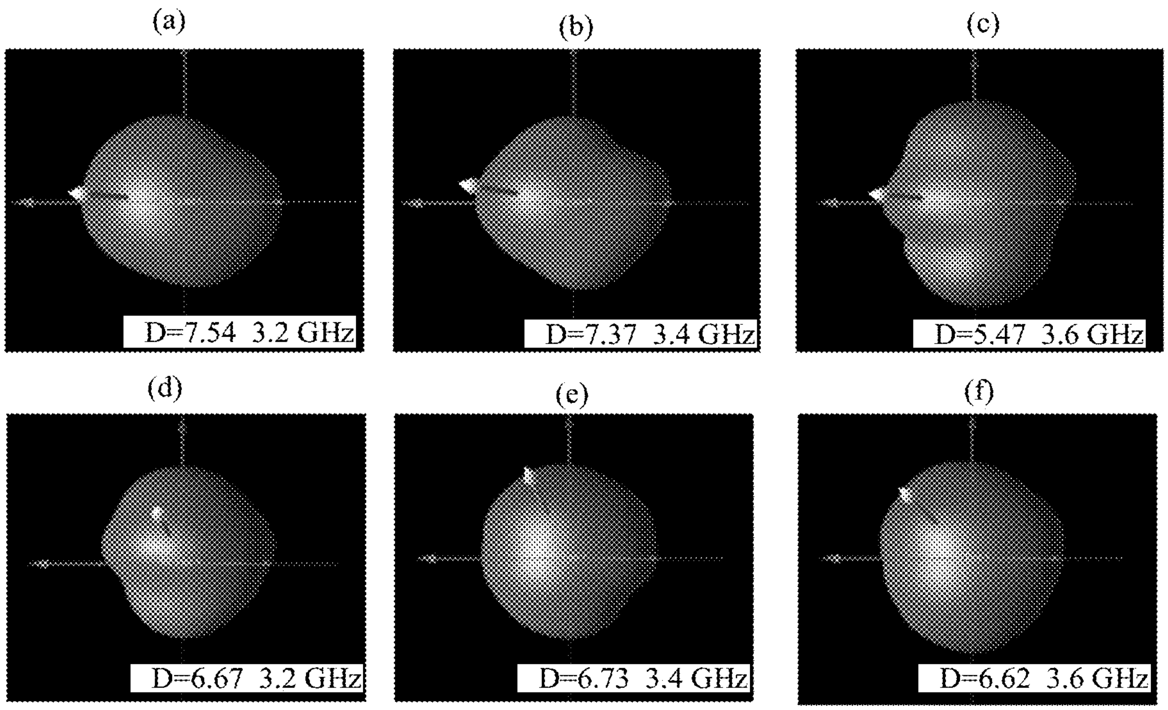
FIG. 11 is a simulation diagram of a radiation direction of the antenna unit in FIG. 10.
Figure 12:
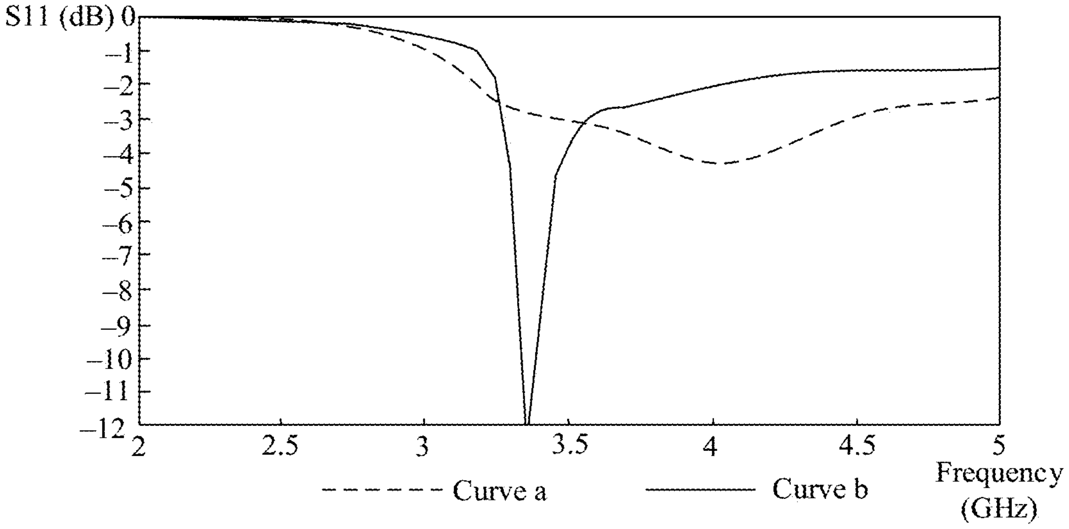
FIG. 12 is a distribution diagram of an S11 parameter of the antenna unit in FIG. 10.
Figure 13:
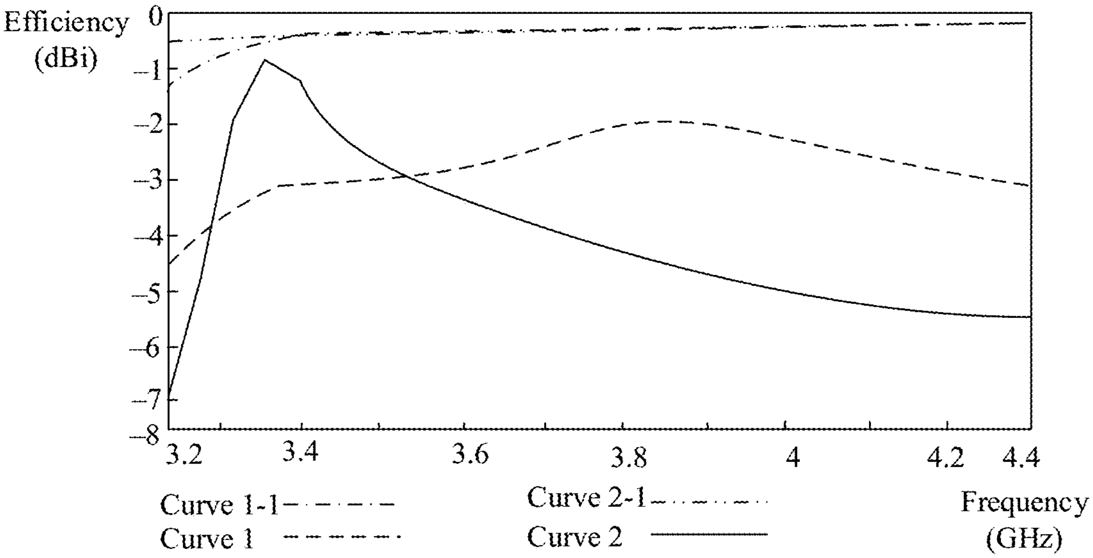
FIG. 13 is a schematic diagram of radiation efficiency of the antenna unit in FIG. 10.

FIG. 11 is a simulation diagram of a radiation direction of another antenna unit according to an embodiment of this application. FIG. 12 is a distribution diagram of an S11 parameter of another antenna unit according to an embodiment of this application. FIG. 13 is a schematic diagram of antenna radiation efficiency of an antenna unit according to an embodiment of this application.

The metal plate 32 is, for example, square. Both the first edge L1 and the second edge L2 have a size of 16 mm.

A capacitance value of the capacitive element C is 0.6 pF.

When the antenna unit operates in the first radiation mode, the capacitance value of the first tunable capacitor 2001 is, for example, 1.2 pF, and the capacitance value of the second tunable capacitor is 0.3 pF.

When the antenna unit operates in the second radiation mode, the capacitance value of the first tunable capacitor 2001 is, for example, 0.3 pF, and the capacitance value of the second tunable capacitor is 1.2 pF.

Simulation diagrams of a radiation direction of the antenna unit when the antenna unit operates in the first radiation mode are shown in (a), (b), and (c) in FIG. 11. Referring to (a), (b), and (c) in FIG. 11, when the antenna unit operating in the first radiation mode resonates in an N78 (3.3 GHz to 3.7 GHz) frequency band, a main radiation direction is a first direction.

A distribution diagram of an S11 parameter when the antenna unit operates in the first radiation mode is shown by a curve a in FIG. 12. As shown by the curve a in FIG. 12, when the antenna unit operating in the first radiation mode resonates, the S11 parameter is relatively small, and an antenna return loss is relatively low. In this case, antenna radiation efficiency is relatively high. For the antenna radiation efficiency of the antenna unit operating in the first radiation mode, refer to a curve 1 in FIG. 13. As shown by the curve 1 in FIG. 13, when the antenna unit operating in the first radiation mode resonates, the antenna radiation efficiency is relatively high.

Simulation diagrams of the radiation direction of the antenna unit when the antenna unit operates in the first radiation mode are shown in (d), (e), and (f) in FIG. 11. Referring to (d), (e), and (f) in FIG. 11, when the antenna unit operating in the second radiation mode resonates in the N78 (3.3 GHz to 3.7 GHz) frequency band, the main radiation direction is a second direction.

A distribution diagram of the S11 parameter when the antenna unit operates in the second radiation mode is shown by a curve b in FIG. 12. As shown by the curve b in FIG. 12, when the antenna unit operating in the second radiation mode resonates, the S11 parameter is relatively small, and an antenna return loss is relatively low. In this case, antenna radiation efficiency is relatively high. For the antenna radiation efficiency of the antenna unit operating in the second radiation mode, refer to a curve 2 in FIG. 13. As shown by the curve 2 in FIG. 6, when the antenna unit operating in the second radiation mode resonates, the antenna radiation efficiency is relatively high.

In addition, for antenna system efficiency of the antenna unit operating in the first radiation mode, refer to a curve 1-1 in FIG. 13. For antenna system efficiency of the antenna unit operating in the second radiation mode, refer to a curve 2-1 in FIG. 13.

Therefore, the main radiation direction of the radiator in the first radiation mode is the first direction, and the main radiation direction of the radiator in the second radiation mode is the second direction.

The first radiation mode is, for example, a landscape mode, and the second radiation mode is, for example, a portrait mode.

Figure 14:
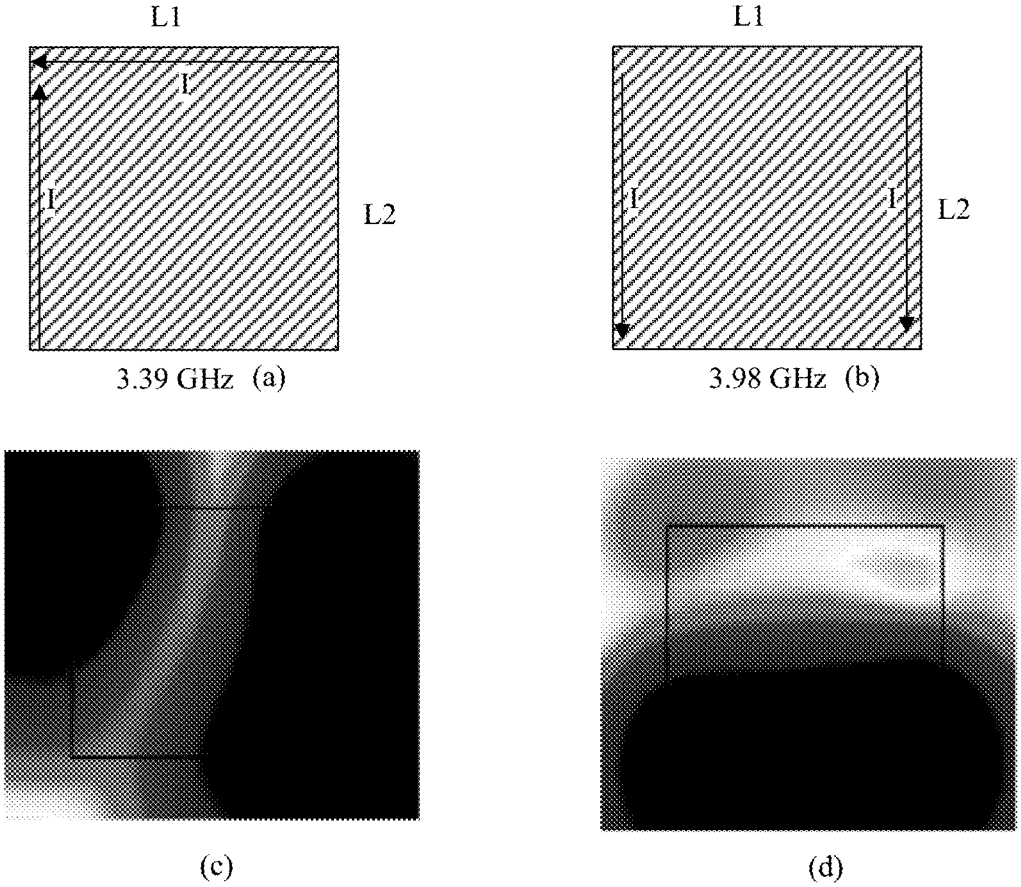
FIG. 14 is a schematic diagram of distributions of a current and an electric field of the antenna unit in FIG. 10 in a first radiation mode.

(a) and (b) in FIG. 14 are schematic diagrams of a distribution of a current of the patch antenna in the first radiation mode. In the first radiation mode, the current mainly flows on a longitudinal edge. (c) and (d) in FIG. 14 are schematic diagrams of a distribution of an electric field of the patch antenna in the first radiation mode. In the first radiation mode, electric field strength on a horizontal edge is relatively high.

Figure 15:
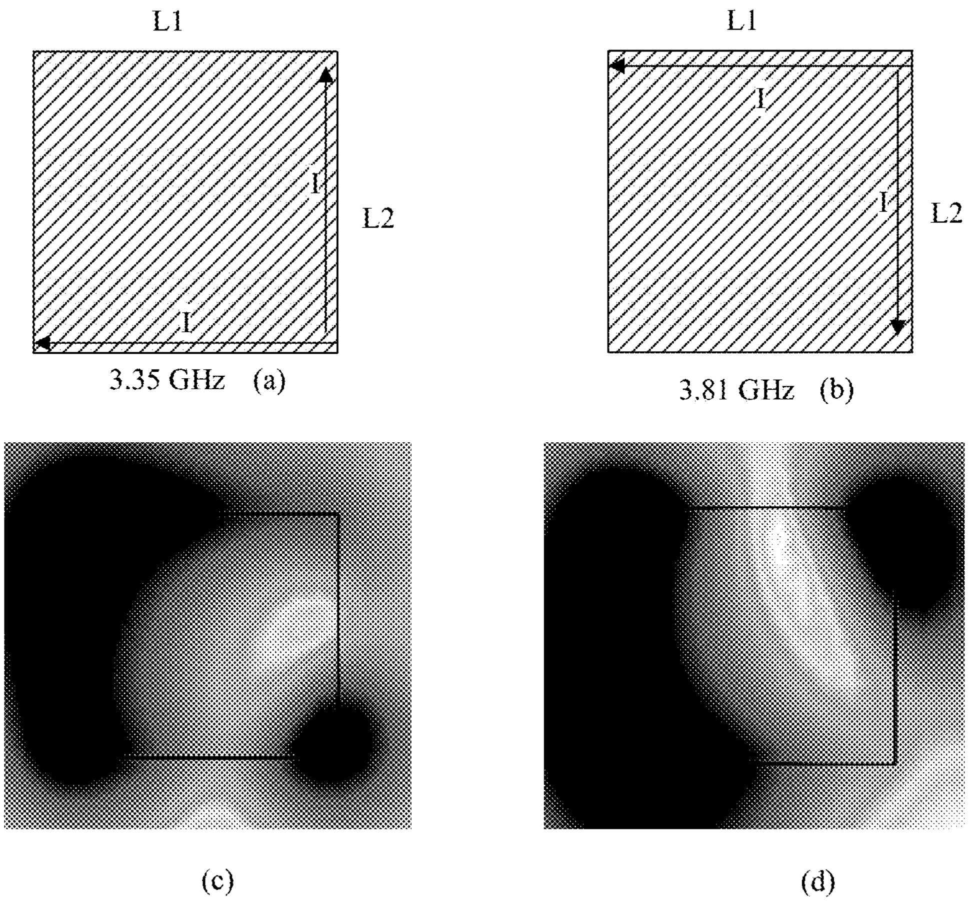
FIG. 15 is a schematic diagram of distributions of a current and an electric field of the antenna unit in FIG. 10 in a second radiation mode.

(a) and (b) in FIG. 15 are schematic diagrams of a distribution of the current of the patch antenna in the second radiation mode. In the second radiation mode, the current mainly flows on the horizontal edge. (c) and (d) in FIG. 14 are schematic diagrams of a distribution of the electric field of the patch antenna in the second radiation mode. In the first radiation mode, electric field strength on the longitudinal edge is relatively high.

Figure 16:
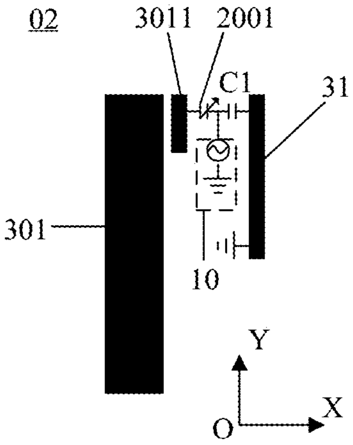
FIG. 16 is a schematic diagram depicting a structure of another antenna unit according to an embodiment of this application.

In some other embodiments of this application, as shown in FIG. 16, the antenna unit 02 includes a frame radiator 31 disposed on the middle frame 3 and a first radiator 301 disposed on the rear housing 4. The frame radiator 31 and the first radiator 301 are of different structures.

The frame radiator 31 is disposed on a horizontal edge or a longitudinal edge of the mobile phone, and has a fixed shape and position. One end of the frame radiator 31 is electrically connected to a feeding unit 10, and the other end is electrically connected to a ground plane. The first radiator 301 is disposed on a housing of the mobile phone. A shape and a position of the first radiator 301 may be adjusted as required. A coupling structure is disposed at two ends of the first radiator 301. Under an action of the coupling structure, a main radiation direction of the first radiator 301 is different from a main radiation direction of the frame radiator 31.

In some embodiments of this application, the frame radiator 31 and the first radiator 301 are connected through distributed feeding.

An angle of the first radiator 301 is not limited in this embodiment of this application.

In some embodiments of this application, as shown in FIG. 16, the frame radiator 31 and the first radiator 301 are of, for example, a rectangular structure. A long edge of the frame radiator 31 is parallel to a y-axis. A short edge of the frame radiator 31 is parallel to an x-axis. A long edge of the first radiator 301 is parallel to the y-axis. A short edge of the first radiator 301 is parallel to the x-axis.

Extension directions of the frame radiator 31 and the first radiator in an XOY plane are parallel.

A first feeding coupling structure 3011 is disposed at a first end of the first radiator. The first feeding coupling structure 3011 is coupled to the first radiator 301. The feeding unit 10 is connected to the first feeding coupling structure 3011 through a first tunable capacitor 2001. The feeding unit 10 is configured to feed the first radiator 301 in a coupling manner through the first feeding coupling structure 3011.

The feeding unit 10 is electrically connected to the frame radiator 31 through a first capacitive element C1.

During operation, the frame radiator 31 is always in an on state, and operates in a first frequency band.

A capacitance value of the first tunable capacitor 2001 is adjustable. When the capacitance value of the first tunable capacitor 2001 is less than a preset threshold, a resonance frequency of the first tunable capacitor 2001 is outside the first frequency band, and the first tunable capacitor 2001 does not resonate and is in a high-resistance state. In this case, the first tunable capacitor 2001 is similar to an insulator, and the feeding unit 10 is disconnected from the first radiator 301.

In this case, only the frame radiator 31 operates in the first frequency band, and the antenna unit operates in a third radiation mode.

Correspondingly, when the capacitance value of the first tunable capacitor 2001 is greater than a preset threshold, a resonance frequency of the first tunable capacitor 2001 is in the first frequency band, the feeding unit 10 is conductively connected to the first radiator 301, and the frame radiator 31 and the first radiator 301 jointly operate in the first frequency band.

In this case, the antenna unit operates in a fourth radiation mode.

Figure 17:
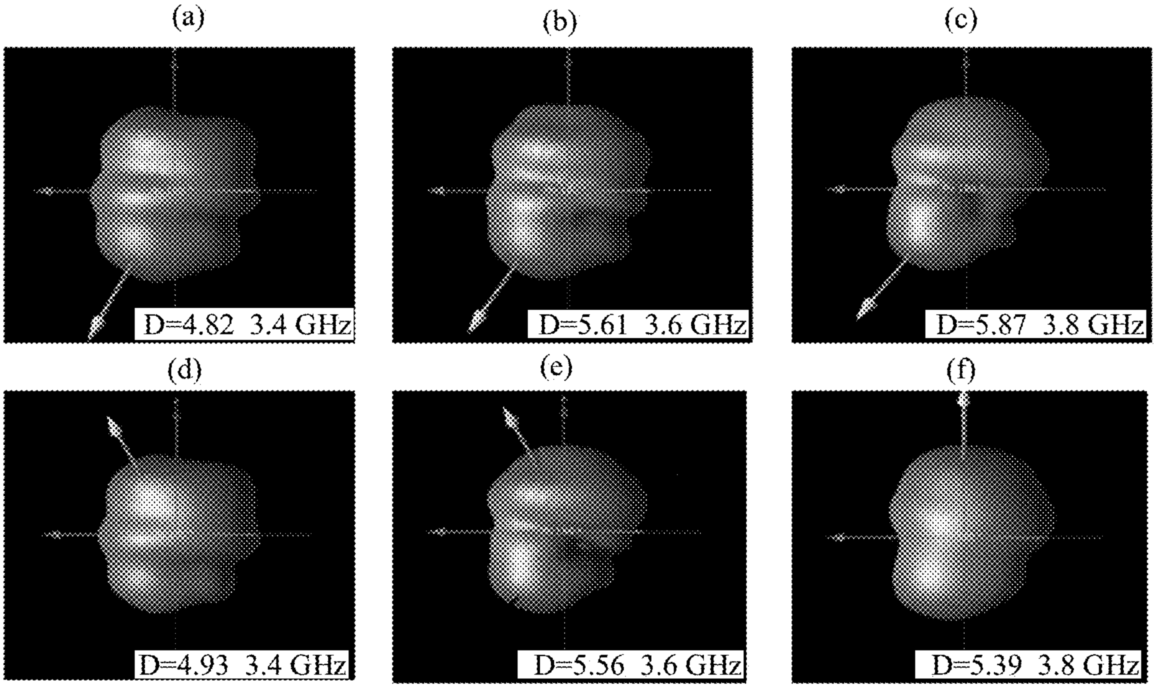
FIG. 17 is a simulation diagram of a radiation direction of the antenna unit in FIG. 16.
Figure 18:
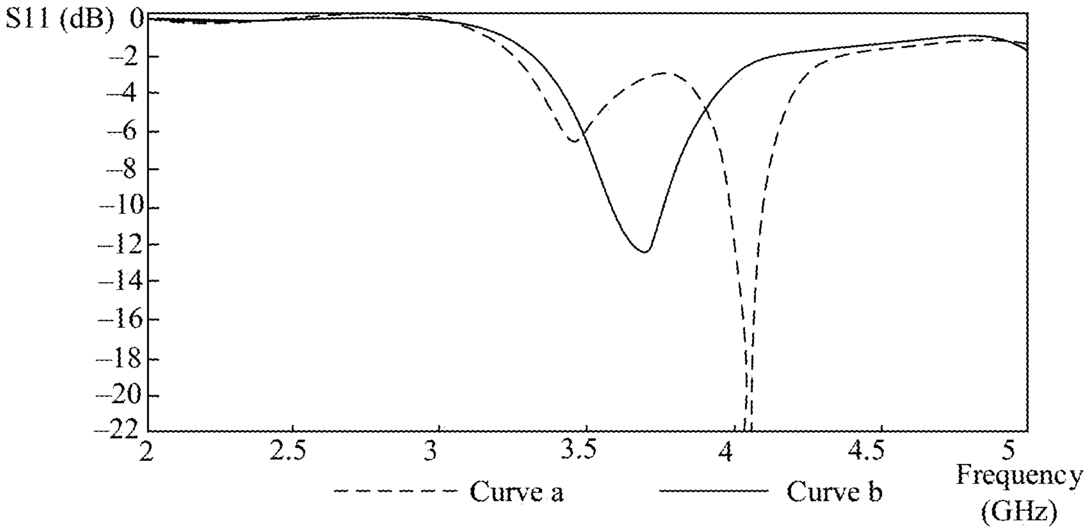
FIG. 18 is a distribution diagram of an S11 parameter of the antenna unit in FIG. 16.
Figure 19:
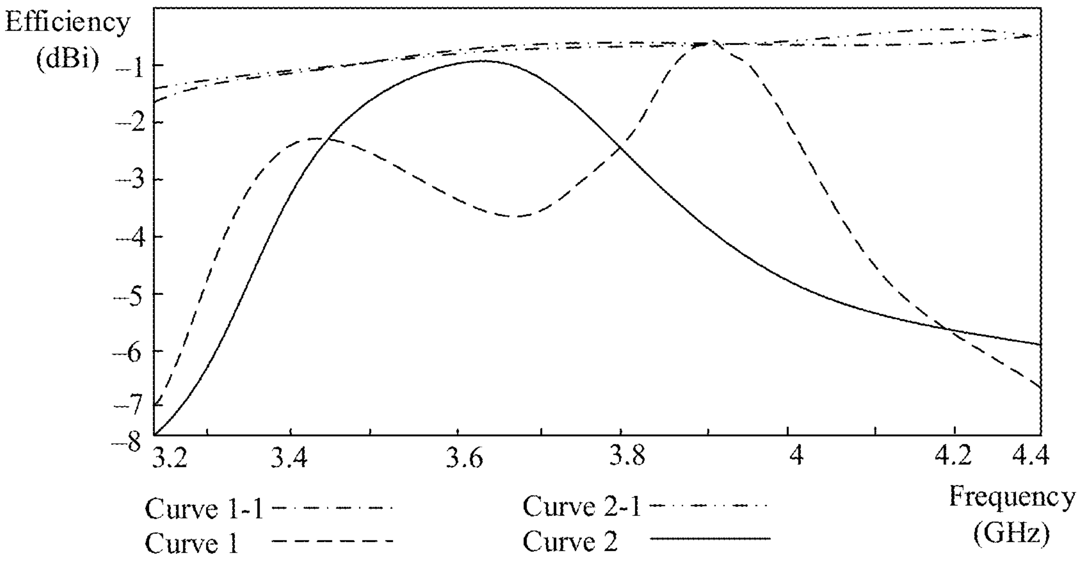
FIG. 19 is a schematic diagram of radiation efficiency of the antenna unit in FIG. 16.

FIG. 17 is a simulation diagram of a radiation direction of another antenna unit according to an embodiment of this application. FIG. 18 is a distribution diagram of an S11 parameter of another antenna unit according to an embodiment of this application. FIG. 19 is a schematic diagram of antenna radiation efficiency of an antenna unit according to an embodiment of this application.

A capacitance value of C1 is 0.2 pF.

When the antenna unit operates in the third radiation mode, the capacitance value of the first tunable capacitor 2001 is, for example, 0.2 pF.

When the antenna unit operates in the fourth radiation mode, the capacitance value of the first tunable capacitor 2001 is, for example, 0.5 pF.

The first frequency band is, for example, an N78 frequency band.

Simulation diagrams of a radiation direction of the antenna unit when the antenna unit operates in the third radiation mode are shown in (a), (b), and (c) in FIG. 17. Referring to (a), (b), and (c) in FIG. 17, when the antenna unit operating in the third radiation mode resonates in the first frequency band, a main radiation direction is a first direction.

A distribution diagram of an S11 parameter when the antenna unit operates in the third radiation mode is shown by a curve a in FIG. 18. As shown by the curve a in FIG. 18, when the antenna unit operating in the third radiation mode resonates, the S11 parameter is relatively small, and an antenna return loss is relatively low. In this case, antenna radiation efficiency is relatively high. For the antenna radiation efficiency of the antenna unit operating in the third radiation mode, refer to a curve 1 in FIG. 19. As shown by the curve 1 in FIG. 19, when the antenna unit operating in the third radiation mode resonates, the antenna radiation efficiency is relatively high.

Simulation diagrams of the radiation direction of the antenna unit when the antenna unit operates in the third radiation mode are shown in (d), (e), and (f) in FIG. 17. Referring to (d), (e), and (f) in FIG. 17, when the antenna unit operating in the fourth radiation mode resonates in the N78 (3.3 GHz to 3.7 GHz) frequency band, the main radiation direction is a second direction.

A distribution diagram of the S11 parameter when the antenna unit operates in the fourth radiation mode is shown by a curve b in FIG. 18. As shown by the curve b in FIG. 18, when the antenna unit operating in the fourth radiation mode resonates, the S11 parameter is relatively small, and an antenna return loss is relatively low. In this case, antenna radiation efficiency is relatively high. For the antenna radiation efficiency of the antenna unit operating in the fourth radiation mode, refer to a curve 2 in FIG. 19. As shown by the curve 2 in FIG. 6, when the antenna unit operating in the fourth radiation mode resonates, the antenna radiation efficiency is relatively high.

In addition, for antenna system efficiency of the antenna unit operating in the third radiation mode, refer to a curve 1-1 in FIG. 19. For antenna system efficiency of the antenna unit operating in the fourth radiation mode, refer to a curve 2-1 in FIG. 19.

Based on the foregoing accompanying drawings, the main radiation direction of the radiator in the third radiation mode is the first direction, and the main radiation direction of the radiator in the fourth radiation mode is the second direction. The second direction is more upward than the first direction.

Therefore, according to the antenna unit provided in this embodiment of this application, distributed feeding is performed on the metal frame radiator and the first radiator disposed on the housing. The tunable capacitor is disposed between the first radiator and the feeding unit, so that a main radiation direction of a metal frame antenna can be changed, and further, the impact of gripping by the user on the antenna radiation performance can be reduced.

Figure 20:
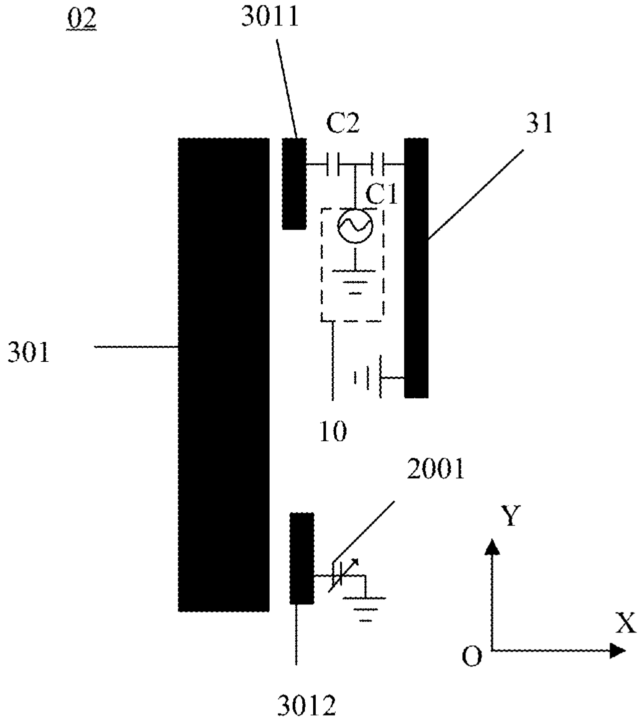
FIG. 20 is a schematic diagram depicting a structure of another antenna unit according to an embodiment of this application.

In another embodiment of this application, as shown in FIG. 20, the first feeding coupling structure 3011 is disposed at the first end of a first radiator 301. A first grounding coupling structure 3012 is disposed at a second end of the first radiator 301. The first grounding coupling structure 3012 is coupled to the first radiator 301. The first tunable capacitor 2001 is disposed between the first grounding coupling structure 3012 and the ground plane. The first radiator 301 is configured to be grounded in a coupling manner through the first grounding coupling structure 3012.

The feeding unit 10 is electrically connected to the frame radiator 31 through the first capacitive element C1, and is electrically connected to the first feeding coupling structure 3011 through a second capacitive element C2.

During operation, the frame radiator 31 is always in the on state, and operates in the first frequency band.

The capacitance value of the first tunable capacitor 2001 is adjustable. When the capacitance value of the first tunable capacitor 2001 is less than the preset threshold, the resonance frequency of the first tunable capacitor 2001 is outside the first frequency band, and the first tunable capacitor 2001 does not resonate and is in the high-resistance state. In this case, the first tunable capacitor 2001 is similar to an insulator, and the feeding unit 10 is disconnected from the first radiator 301.

In this case, only the frame radiator 31 operates in the first frequency band, and the antenna unit operates in the third radiation mode.

Correspondingly, when the capacitance value of the first tunable capacitor 2001 is greater than the preset threshold, the resonance frequency of the first tunable capacitor 2001 is in the first frequency band, the feeding unit 10 is conductively connected to the first radiator 301, and the frame radiator 31 and the first radiator 301 jointly operate in the first frequency band.

In this case, the antenna unit operates in the fourth radiation mode.

Figure 21:
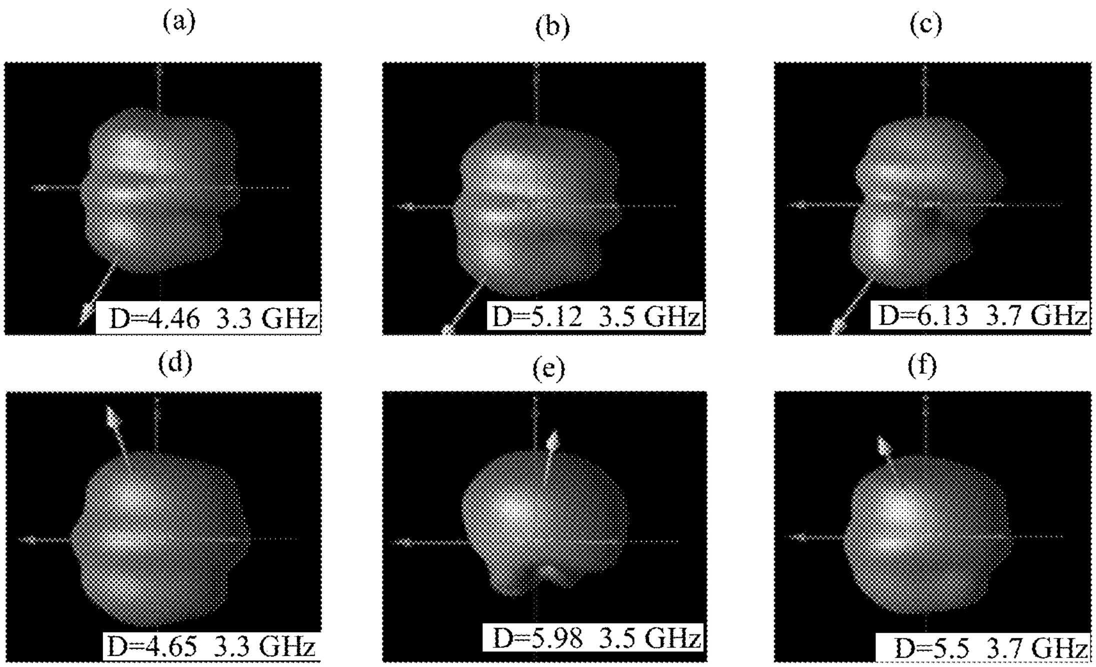
FIG. 21 is a simulation diagram of a radiation direction of the antenna unit in FIG. 20.
Figure 22:
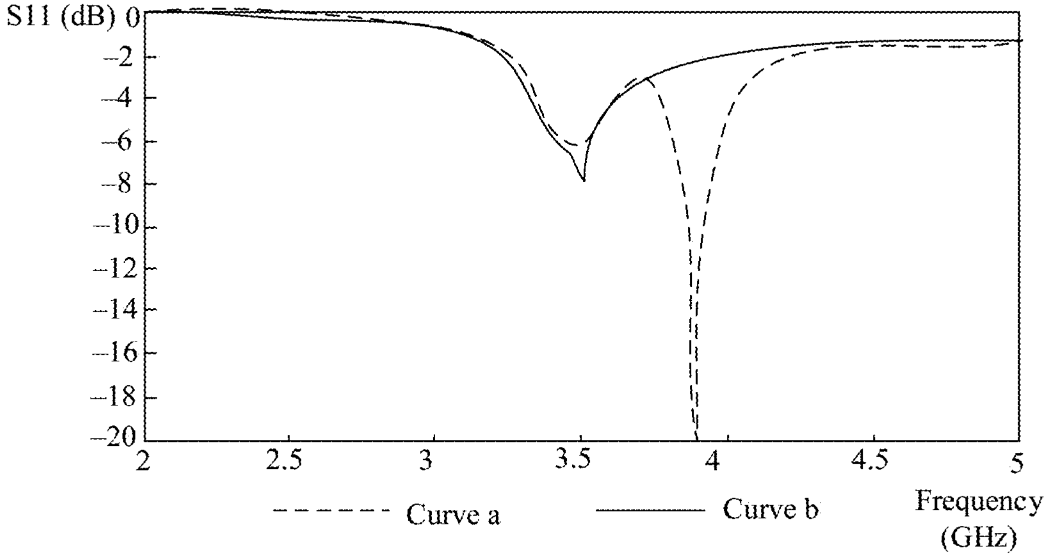
FIG. 22 is a distribution diagram of an S11 parameter of the antenna unit in FIG. 20.
Figure 23:
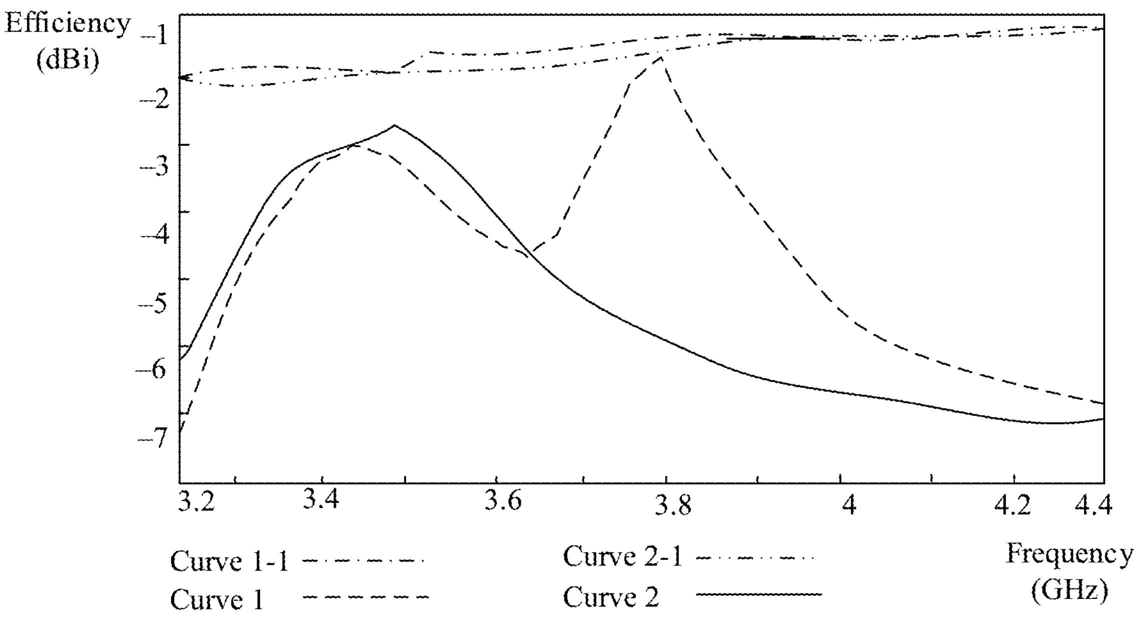
FIG. 23 is a schematic diagram of radiation efficiency of the antenna unit in FIG. 20.

FIG. 21 is a simulation diagram of a radiation direction of another antenna unit according to an embodiment of this application. FIG. 22 is a distribution diagram of an S11 parameter of another antenna unit according to an embodiment of this application. FIG. 23 is a schematic diagram of antenna radiation efficiency of an antenna unit according to an embodiment of this application.

The capacitance value of C1 is 0.2 pF. A capacitance value of C2 is 0.2 pF.

When the antenna unit operates in the third radiation mode, the capacitance value of the first tunable capacitor 2001 is, for example, 0.3 pF.

When the antenna unit operates in the fourth radiation mode, the capacitance value of the first tunable capacitor 2001 is, for example, 0.8 pF.

The first frequency band is, for example, the N78 frequency band.

The simulation diagrams of the radiation direction of the antenna unit when the antenna unit operates in the third radiation mode are shown in (a), (b), and (c) in FIG. 21. Referring to (a), (b), and (c) in FIG. 21, when the antenna unit operating in the third radiation mode resonates in the first frequency band, the main radiation direction is the first direction.

The distribution diagram of the S11 parameter when the antenna unit operates in the third radiation mode is shown by a curve a in FIG. 22. As shown by the curve a in FIG. 22, when the antenna unit operating in the third radiation mode resonates, the S11 parameter is relatively small, and the antenna return loss is relatively low. In this case, the antenna radiation efficiency is relatively high. For the antenna radiation efficiency of the antenna unit operating in the third radiation mode, refer to a curve 1 in FIG. 23. As shown by the curve 1 in FIG. 23, when the antenna unit operating in the third radiation mode resonates, the antenna radiation efficiency is relatively high.

The simulation diagrams of the radiation direction of the antenna unit when the antenna unit operates in the third radiation mode are shown in (d), (e), and (f) in FIG. 21. Referring to (d), (e), and (f) in FIG. 21, when the antenna unit operating in the fourth radiation mode resonates in the N78 (3.3 GHz to 3.7 GHz) frequency band, the main radiation direction is the second direction.

The distribution diagram of the S11 parameter when the antenna unit operates in the fourth radiation mode is shown by a curve b in FIG. 22. As shown by the curve b in FIG. 22, when the antenna unit operating in the fourth radiation mode resonates, the S11 parameter is relatively small, and the antenna return loss is relatively low. In this case, the antenna radiation efficiency is relatively high. For the antenna radiation efficiency of the antenna unit operating in the fourth radiation mode, refer to a curve 2 in FIG. 23. As shown by the curve 2 in FIG. 6, when the antenna unit operating in the fourth radiation mode resonates, the antenna radiation efficiency is relatively high.

In addition, for the antenna system efficiency of the antenna unit operating in the third radiation mode, refer to a curve 1-1 in FIG. 23. For the antenna system efficiency of the antenna unit operating in the fourth radiation mode, refer to a curve 2-1 in FIG. 23.

Based on the foregoing accompanying drawings, the main radiation direction of the radiator in the third radiation mode is the first direction, and the main radiation direction of the radiator in the fourth radiation mode is the second direction. The second direction is more upward than the first direction. In addition, compared with the foregoing embodiments, in this embodiment of this application, a deflection angle between the second direction and the first direction is larger.

Therefore, according to the antenna unit provided in this embodiment of this application, distributed feeding is performed on the metal frame radiator and the first radiator disposed on the housing. The tunable capacitor is disposed between the first radiator and the ground plane, so that the main radiation direction of the metal frame antenna can be changed, and further, the impact of gripping by the user on the antenna radiation performance can be reduced. In addition, the first grounding coupling structure 3012 is disposed at a tail end of the first radiator, so that the deflection angle of the main radiation direction of the antenna unit is enlarged.

Figure 24:
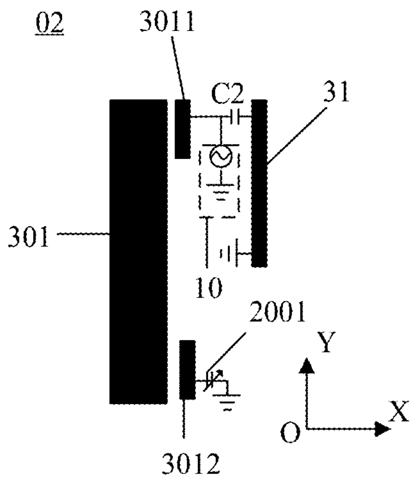
FIG. 24 is a schematic diagram depicting a structure of another antenna unit according to an embodiment of this application.

In some other embodiments of this application, as shown in FIG. 24, compared with the foregoing embodiment, the feeding unit 10 may be directly connected to the first feeding coupling structure 3011, no capacitive element needs to be disposed between the feeding unit 10 and the first feeding coupling structure 3011, and a feeding capacitor may be directly replaced with the first feeding coupling structure 3011.

Figure 25:
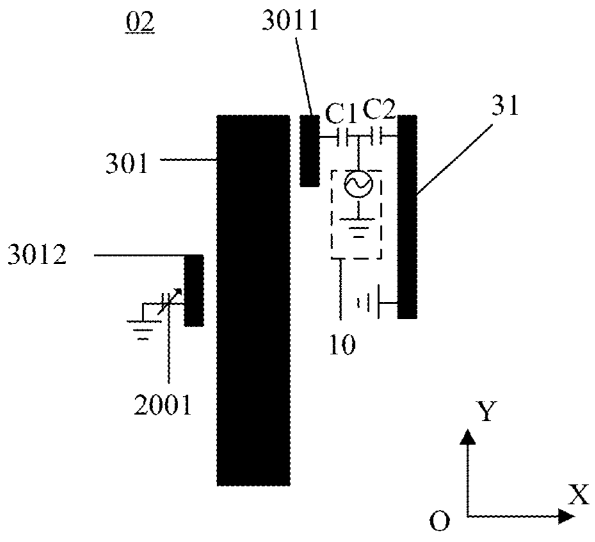
FIG. 25 is a schematic diagram depicting a structure of another antenna unit according to an embodiment of this application.

In some other embodiments of this application, as shown in FIG. 25, the first feeding coupling structure 3011 is disposed at the first end of the first radiator 301. A first grounding coupling structure 3012 is disposed at a middle position of the first radiator 301.

The first grounding coupling structure 3012 is coupled to the first radiator 301. The first tunable capacitor 2001 is disposed between the first grounding coupling structure 3012 and the ground plane. The first radiator 301 is configured to be grounded in a coupling manner through the first grounding coupling structure 3012.

The feeding unit 10 is electrically connected to the frame radiator 31 and the first feeding coupling structure 3011 separately through the first capacitive element and a second capacitive element.

During operation, the frame radiator 31 is always in the on state, and operates in the first frequency band.

The capacitance value of the first tunable capacitor 2001 is adjustable. When the capacitance value of the first tunable capacitor 2001 is less than the preset threshold, the resonance frequency of the first tunable capacitor 2001 is outside the first frequency band, and the first tunable capacitor 2001 does not resonate and is in the high-resistance state. In this case, the first tunable capacitor 2001 is similar to an insulator, and the feeding unit 10 is disconnected from the first radiator 301.

In this case, only the frame radiator 31 operates in the first frequency band, and the antenna unit operates in the third radiation mode.

Correspondingly, when the capacitance value of the first tunable capacitor 2001 is greater than the preset threshold, the resonance frequency of the first tunable capacitor 2001 is in the first frequency band, the feeding unit 10 is conductively connected to the first radiator 301, and the frame radiator 31 and the first radiator 301 jointly operate in the first frequency band.

In this case, the antenna unit operates in the fourth radiation mode.

It should be noted that, in the foregoing embodiment, the first grounding coupling structure 3012 is disposed at the second end of the first radiator 301. During operation, a current of the first radiator 301 separately flows from the first end of the first radiator 301 to the second end of the first radiator 301, and an operating mode of the first radiator 301 is a differential mode (DM).

Because the first grounding coupling structure 3012 is disposed at the middle position of the first radiator 301, during operation, the current of the first radiator 301 flows from the first end of the first radiator 301 and the second end of the first radiator 301 to the middle position respectively, the operating mode of the first radiator 301 is a common mode (CM).

In some other embodiments of this application, the coupling structures may be separately disposed at the middle position and the second end of the first radiator 301. The tunable capacitor is disposed between the coupling structure and the ground plane. The capacitance value of each tunable capacitor is adjusted, so that the middle position of the first radiator 301 is grounded in a coupling manner, or the second end of the first radiator is grounded in a coupling manner. When the middle position of the first radiator 301 is grounded in a coupling manner, the operating mode of the first radiator 301 is the common mode (CM). When the second end of the first radiator is grounded in a coupling manner, the operating mode of the first radiator 301 is the differential mode (DM). The capacitance values of the two tunable capacitors may be adjusted to implement switching between the common mode and the differential mode, so as to change the main radiation direction of the antenna.

Therefore, when the grounding coupling structure is close to the second end of the radiator, the operating mode of the radiator is the differential mode, or when the grounding coupling structure is close to the middle position of the radiator, the operating mode of the radiator is the common mode. In the differential mode and the common mode, the radiator has different main radiation directions. The main radiation direction of the antenna unit may be flexibly adjusted by switching between the differential mode and the common mode of the radiator, thereby reducing the impact of gripping by the user on the antenna radiation performance.

Figure 26:
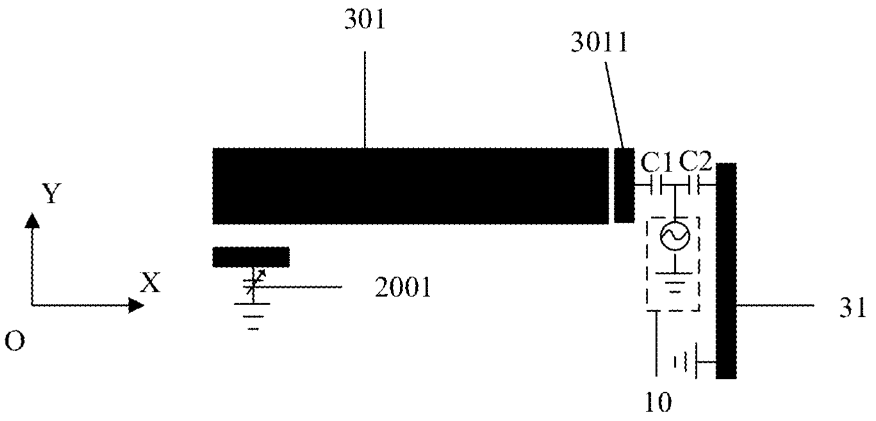
FIG. 26 is a schematic diagram depicting a structure of another antenna unit according to an embodiment of this application.

In some other embodiments of this application, as shown in FIG. 26, the antenna unit 02 includes a frame radiator 31 disposed on the middle frame 3 and a first radiator 301 disposed on the rear housing 4.

For example, the frame radiator 31 and the first radiator 301 are of a rectangular structure. A difference from the foregoing embodiment lies in that a long edge of the frame radiator 31 is parallel to a y-axis, and a short edge of the frame radiator 31 is parallel to an x-axis. A long edge of the first radiator 301 is parallel to the x-axis, and a short edge of the first radiator 301 is parallel to the y-axis.

Extension directions of the frame radiator 31 and the first radiator in an XOY plane are perpendicular.

A feeding unit 10 is electrically connected to the frame radiator 31 through a first capacitive element C1, and is electrically connected to a first feeding coupling structure 3011 through a second capacitive element C2.

The first feeding coupling structure 3011 is disposed at a first end of the first radiator. A first grounding coupling structure 3012 is disposed at a second end of the first radiator.

The first feeding coupling structure 3011 is coupled to the first end of the first radiator 301. The feeding unit 10 is configured to feed the first radiator 301 in a coupling manner through the first feeding coupling structure 3011.

The first grounding coupling structure 3012 is coupled to the second end of the first radiator 301. The first radiator 301 is configured to be grounded in a coupling manner through the first grounding coupling structure 3012.

The first grounding coupling structure 3012 is connected to a ground plane through a first tunable capacitor 2001.

During operation, the frame radiator 31 is always in an on state, and operates in a first frequency band.

A capacitance value of the first tunable capacitor 2001 is adjustable. When the capacitance value of the first tunable capacitor 2001 is less than a preset threshold, a resonance frequency of the first tunable capacitor 2001 is outside a first frequency band, and the first tunable capacitor 2001 does not resonate and is in a high-resistance state. In this case, the first tunable capacitor 2001 is similar to an insulator, and the feeding unit 10 is disconnected from the first radiator 301.

In this case, only the frame radiator 31 operates in the first frequency band, and the antenna unit operates in a third radiation mode.

Correspondingly, when the capacitance value of the first tunable capacitor 2001 is greater than a preset threshold, a resonance frequency of the first tunable capacitor 2001 is in a first frequency band, the feeding unit 10 is conductively connected to the first radiator 301, and the frame radiator 31 and the first radiator 301 jointly operate in the first frequency band.

In this case, the antenna unit operates in a fourth radiation mode.

Figure 27:
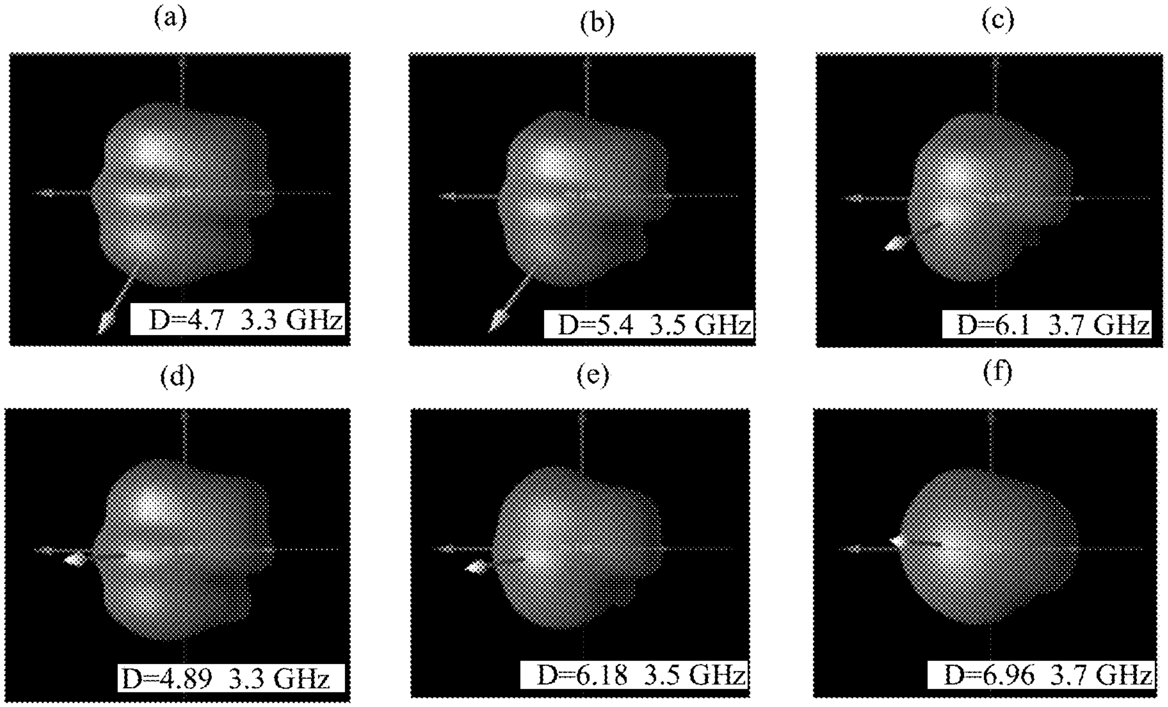
FIG. 27 is a simulation diagram of a radiation direction of the antenna unit in FIG. 26.
Figure 28:
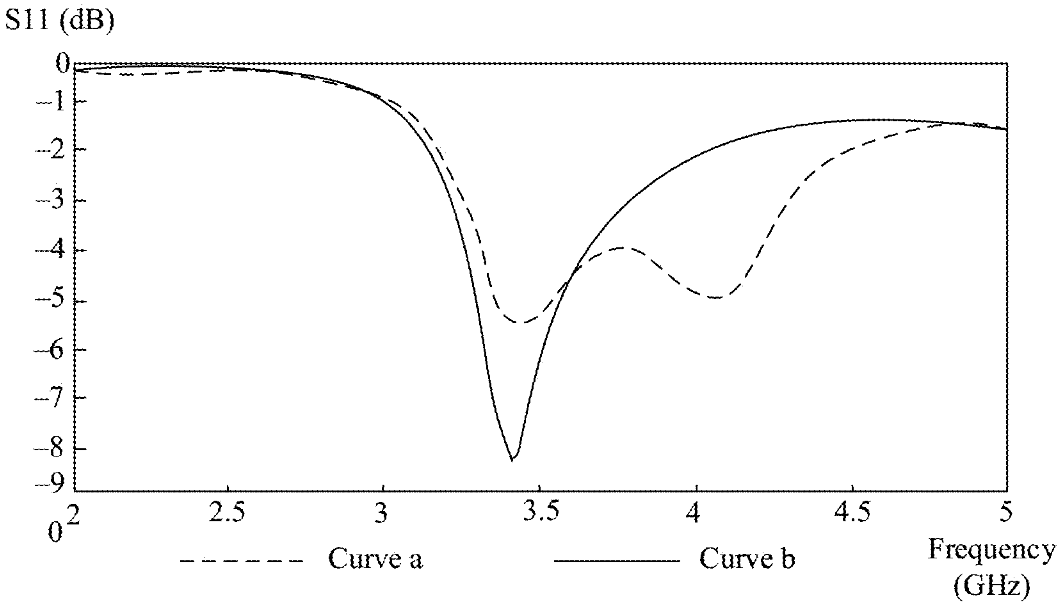
FIG. 28 is a distribution diagram of an S11 parameter of the antenna unit in FIG. 26.
Figure 29:
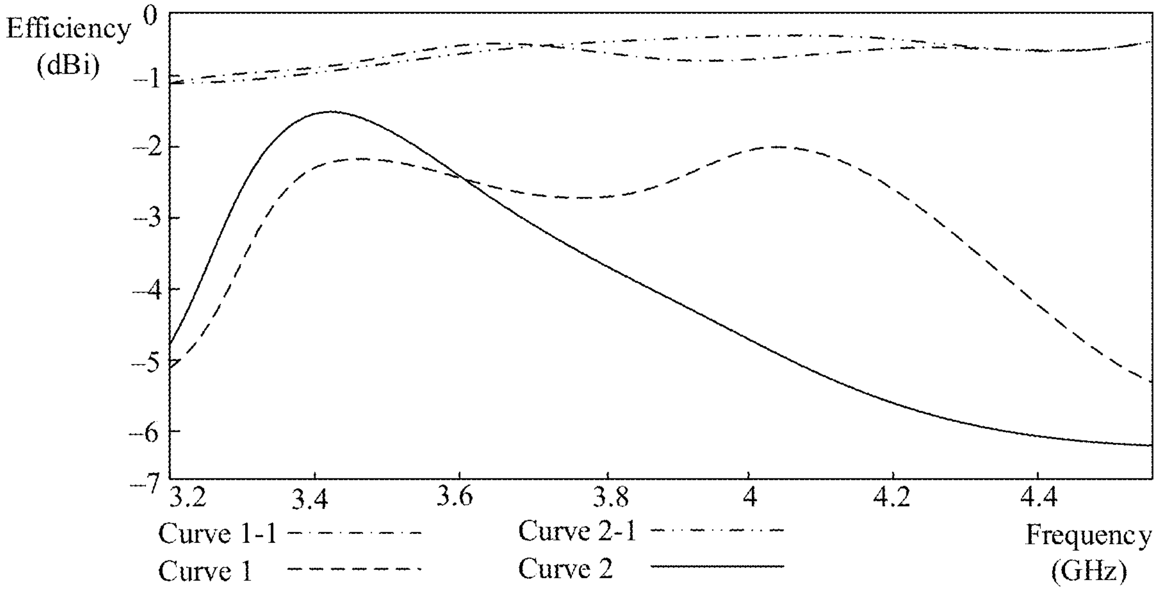
FIG. 29 is a schematic diagram of radiation efficiency of the antenna unit in FIG. 26.

FIG. 27 is a simulation diagram of a radiation direction of another antenna unit according to an embodiment of this application. FIG. 28 is a distribution diagram of an S11 parameter of another antenna unit according to an embodiment of this application. FIG. 29 is a schematic diagram of antenna radiation efficiency of an antenna unit according to an embodiment of this application.

A capacitance value of C1 is 0.3 pF. A capacitance value of C2 is 0.2 pF.

When the antenna unit operates in the third radiation mode, the capacitance value of the first tunable capacitor 2001 is, for example, 0.3 pF.

When the antenna unit operates in the fourth radiation mode, the capacitance value of the first tunable capacitor 2001 is, for example, 0.5 pF.

The first frequency band is, for example, an N78 frequency band.

Simulation diagrams of a radiation direction of the antenna unit when the antenna unit operates in the third radiation mode are shown in (a), (b), and (c) in FIG. 27. Referring to (a), (b), and (c) in FIG. 27, when the antenna unit operating in the third radiation mode resonates in the first frequency band, a main radiation direction is a first direction.

A distribution diagram of an S11 parameter when the antenna unit operates in the third radiation mode is shown by a curve a in FIG. 28. As shown by the curve a in FIG. 28, when the antenna unit operating in the third radiation mode resonates, the S11 parameter is relatively small, and an antenna return loss is relatively low. In this case, antenna radiation efficiency is relatively high. For the antenna radiation efficiency of the antenna unit operating in the third radiation mode, refer to a curve 1 in FIG. 29. As shown by the curve 1 in FIG. 29, when the antenna unit operating in the third radiation mode resonates, the antenna radiation efficiency is relatively high.

Simulation diagrams of the radiation direction of the antenna unit when the antenna unit operates in the third radiation mode are shown in (d), (e), and (f) in FIG. 27. Referring to (d), (e), and (f) in FIG. 27, when the antenna unit operating in the fourth radiation mode resonates in the N78 (3.3 GHz to 3.7 GHz) frequency band, the main radiation direction is a second direction.

A distribution diagram of the S11 parameter when the antenna unit operates in the fourth radiation mode is shown by a curve b in FIG. 28. As shown by the curve b in FIG. 28, when the antenna unit operating in the fourth radiation mode resonates, the S11 parameter is relatively small, and an antenna return loss is relatively low. In this case, antenna radiation efficiency is relatively high. For the antenna radiation efficiency of the antenna unit operating in the fourth radiation mode, refer to a curve 2 in FIG. 29. As shown by the curve 2 in FIG. 6, when the antenna unit operating in the fourth radiation mode resonates, the antenna radiation efficiency is relatively high.

In addition, for the antenna system efficiency of the antenna unit operating in the third radiation mode, refer to a curve 1-1 in FIG. 29. For the antenna system efficiency of the antenna unit operating in the fourth radiation mode, refer to a curve 2-1 in FIG. 29.

Based on the foregoing accompanying drawings, the main radiation direction of the radiator in the third radiation mode is the first direction, and the main radiation direction of the radiator in the fourth radiation mode is the second direction. The second direction is inclined more to the left than the first direction.

Therefore, according to the antenna unit provided in this embodiment of this application, distributed feeding is performed on the metal frame radiator and the first radiator disposed on the housing. The tunable capacitor is disposed between the first radiator and the feeding unit, so that a main radiation direction of a metal frame antenna can be changed, and further, the impact of gripping by the user on the antenna radiation performance can be reduced.

Figure 30A:
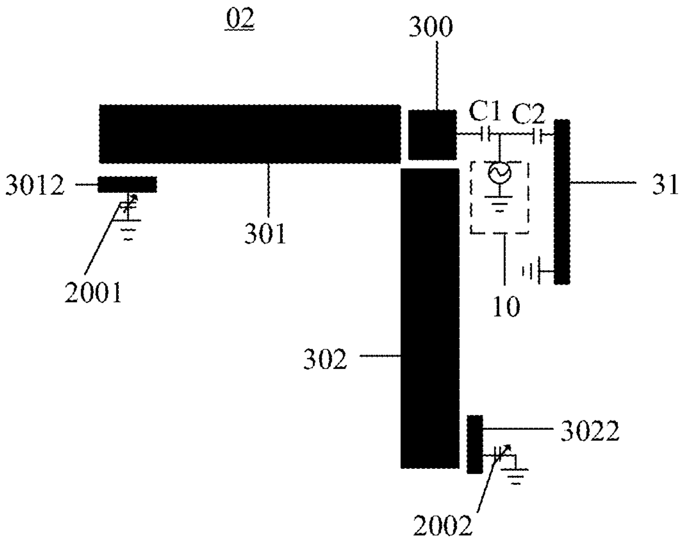
FIG. 30*a* is a schematic diagram depicting a structure of another antenna unit according to an embodiment of this application.

In some other embodiments of this application, as shown in FIG. 30*a*, the antenna unit 02 includes a frame radiator 31 disposed on the middle frame 3, and a first radiator 301 and a second radiator 302 that are disposed on the rear housing 4.

The first radiator 301 and the second radiator 302 intersect. An included angle between the first radiator 301 and the second radiator 302 is 90°.

The frame radiator 31, the first radiator 301, and the second radiator 302 are all of a rectangular structure.

A long edge of the frame radiator 31 is parallel to a y-axis. A short edge of the frame radiator 31 is parallel to an x-axis. A long edge of the first radiator 301 is parallel to the y-axis. A short edge of the first radiator 301 is parallel to the x-axis. A long edge of the second radiator 302 is parallel to the x-axis. A short edge of the second radiator 302 is parallel to the y-axis.

Extension directions of the frame radiator 31 and the first radiator 301 in an XOY plane are perpendicular. Extension directions of the frame radiator 31 and the second radiator 302 in the XOY plane are parallel.

The first radiator 301 and the second radiator 302 share one distributed feeding coupling structure 300. A feeding unit feeds two or more radiators in a coupling manner through the one distributed feeding coupling structure 300. The first radiator 301 and the second radiator 302 are separately parallel to one edge of the distributed feeding coupling structure 300.

The feeding unit 10 is electrically connected to the frame radiator 31 through a first capacitive element C1, and is electrically connected to the distributed feeding coupling structure 300 through a second capacitive element C2.

A first grounding coupling structure 3012 is disposed at a second end of the first radiator 301. The first grounding coupling structure 3012 is coupled to the first radiator 301. The first radiator 301 is grounded in a coupling manner through the first grounding coupling structure 3012.

Correspondingly, a second grounding coupling structure 3022 is disposed at a fourth end of the second radiator 302. The second grounding coupling structure 3022 is coupled to the first radiator 301. The second radiator 302 is grounded in a coupling manner through the second grounding coupling structure 3022.

In addition, a first tunable capacitor 2001 is connected in series between the first grounding coupling structure 3012 and a ground plane. A second tunable capacitor 2002 is connected in series between the second grounding coupling structure 3022 and the ground plane. Capacitance values of the first tunable capacitor 2001 and the second tunable capacitor 2002 are adjustable. The first tunable capacitor 2001 and the second tunable capacitor 2002 are configured to adjust a resonance frequency.

During operation, the frame radiator 31 is always in an on state, and operates in a first frequency band.

The capacitance values of the first tunable capacitor 2001 and the second tunable capacitor 2002 are adjustable.

When the capacitance values of the first tunable capacitor 2001 and the second tunable capacitor are both less than a preset threshold, a resonance frequency of the first tunable capacitor 2001 is outside a first frequency band, and the first tunable capacitor 2001 and the second tunable capacitor 2002 do not resonate and are in a high-resistance state. In this case, the first tunable capacitor 2001 and the second tunable capacitor are similar to an insulator, and the feeding unit 10 is disconnected from the first radiator 301 and the second radiator 302.

In this case, only the frame radiator 31 operates in the first frequency band, and the antenna unit operates in a third radiation mode.

Correspondingly, when the capacitance value of the first tunable capacitor 2001 is a preset threshold and the capacitance value of the second tunable capacitor 2002 is less than the preset threshold, a resonance frequency of the first tunable capacitor 2001 is in a first frequency band, and the first tunable capacitor 2001 resonates and is in a low-resistance state. In this case, the first tunable capacitor 2001 is similar to a conductor, and the feeding unit 10 is conductively connected to the first radiator 301.

When an electromagnetic wave whose frequency is in the first frequency band is transmitted to the second tunable capacitor 2002, the second tunable capacitor 2002 does not resonate and is in a high-resistance state, because a resonance frequency of the second tunable capacitor 2002 is outside the first frequency band. In this case, the second tunable capacitor 2002 is similar to an insulator, and the feeding unit 10 is disconnected from the second radiator 302.

In this case, the frame radiator 31 and the first radiator 301 operate in the first frequency band, and the antenna unit 02 operates in a fourth radiation mode.

Correspondingly, when the capacitance value of the first tunable capacitor 2001 is less than a preset threshold and the capacitance value of the second tunable capacitor 2002 is the preset threshold, a resonance frequency of the first tunable capacitor 2001 is outside a first frequency band, and the first tunable capacitor 2001 does not resonate and is in a high-resistance state. In this case, the first tunable capacitor 2001 is similar to an insulator, and the feeding unit 10 is disconnected from the first radiator 301.

A resonance frequency of the second tunable capacitor 2002 is in the first frequency band, and the second tunable capacitor 2002 resonates and is in a low-resistance state. In this case, the second tunable capacitor 2002 is similar to a conductor, and the feeding unit 10 is conductively connected to the second radiator 302.

In this case, the frame radiator 31 and the second radiator 302 operate in the first frequency band, and the antenna unit 02 operates in a fifth radiation mode.

Figure 30B:
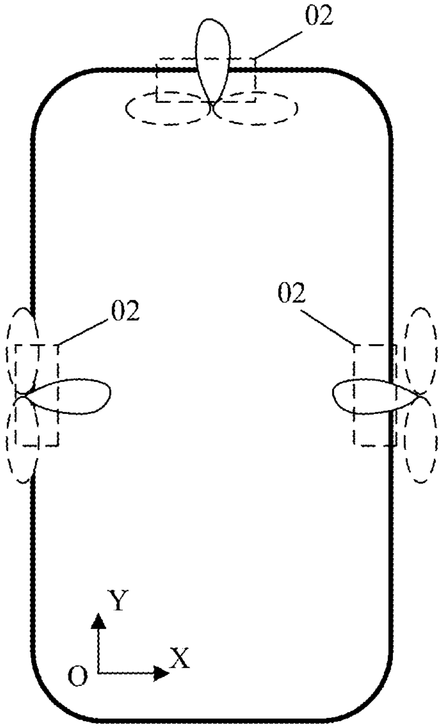
FIG. 30*b* is a schematic diagram of a main radiation direction of the antenna unit in FIG. 30*a;*

As shown in FIG. 30*b*, the antenna unit 02 may be disposed on a left side, a right side, and a top of the communication device 01.

Figure 31:
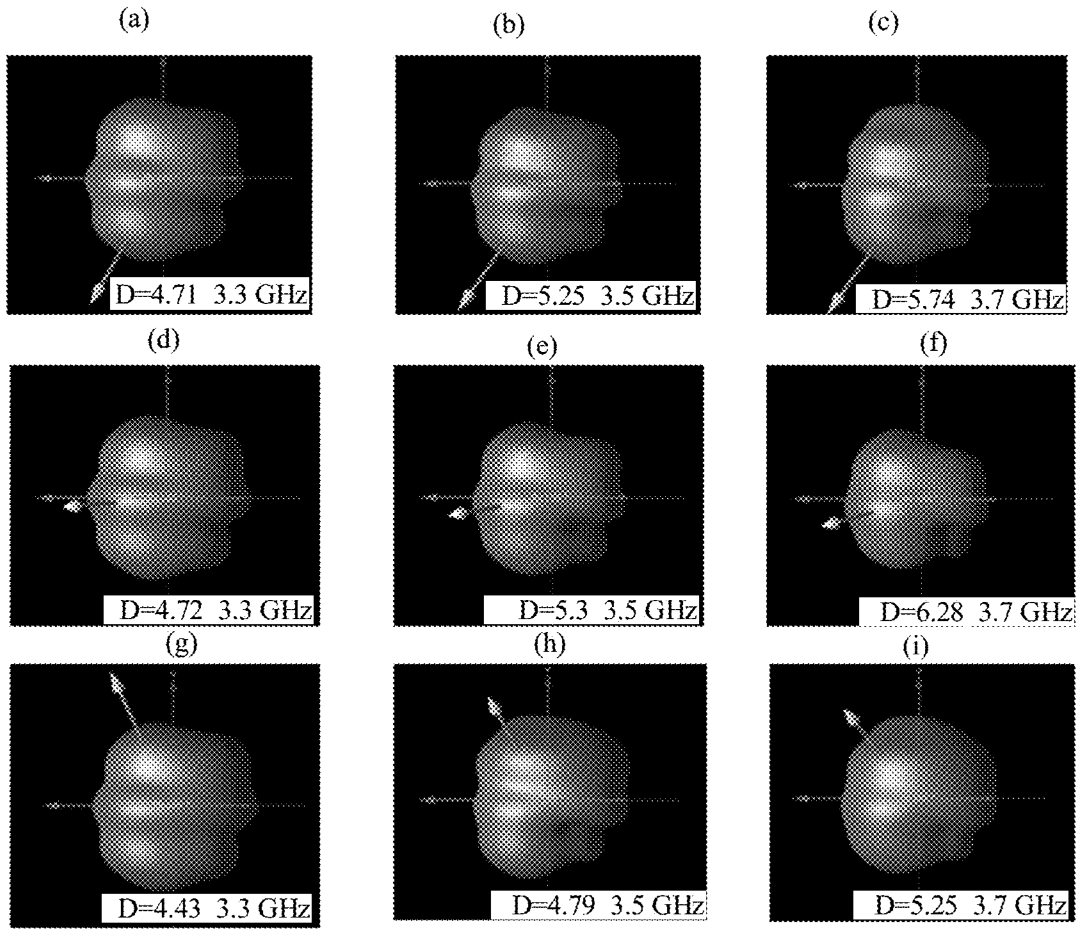
FIG. 31 is a simulation diagram of a radiation direction of the antenna unit in FIG. 30*a;*
Figure 32:
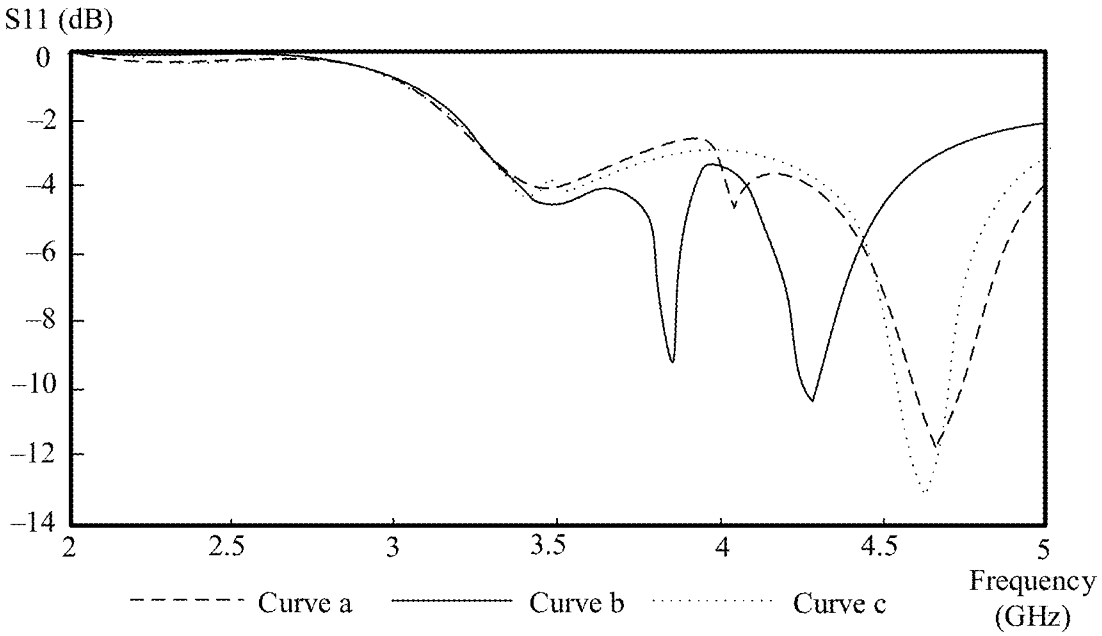
FIG. 32 is a distribution diagram of an S11 parameter of the antenna unit in FIG. 30*a;*
Figure 33:
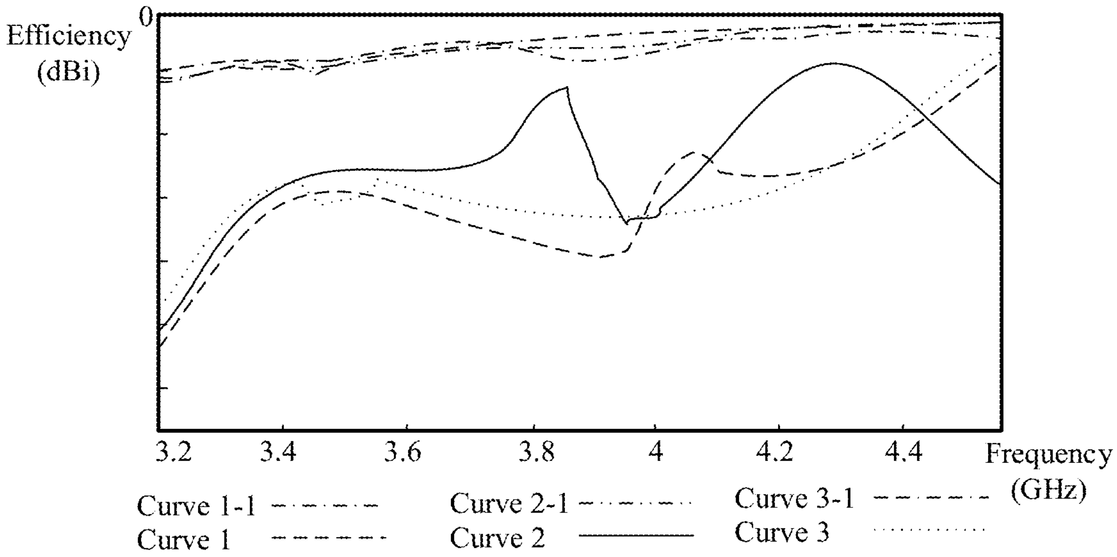
FIG. 33 is a schematic diagram of radiation efficiency of the antenna unit in FIG. 30*a;*

FIG. 31 is a simulation diagram of a radiation direction of another antenna unit according to an embodiment of this application. FIG. 32 is a distribution diagram of an S11 parameter of another antenna unit according to an embodiment of this application. FIG. 33 is a schematic diagram of antenna radiation efficiency of an antenna unit according to an embodiment of this application.

A capacitance value of C1 is 0.3 pF. A capacitance value of C2 is 0.2 pF.

When the antenna unit operates in the third radiation mode, the capacitance value of the first tunable capacitor 2001 is 0.3 pF, and the capacitance value of the second tunable capacitor is 0.3 pF.

When the antenna unit operates in the fourth radiation mode, the capacitance value of the first tunable capacitor 2001 is 1.2 pF, and the capacitance value of the second tunable capacitor is 0.3 pF.

When the antenna unit operates in the fourth radiation mode, the capacitance value of the first tunable capacitor 2001 is 0.3 pF, and the capacitance value of the second tunable capacitor is 1.2 pF.

The first frequency band is, for example, an N78 frequency band.

Simulation diagrams of a radiation direction of the antenna unit when the antenna unit operates in the third radiation mode are shown in (a), (b), and (c) in FIG. 31. Referring to (a), (b), and (c) in FIG. 31, when the antenna unit operating in the third radiation mode resonates in the first frequency band, a main radiation direction is a first direction.

A distribution diagram of an S11 parameter when the antenna unit operates in the third radiation mode is shown by a curve a in FIG. 32. As shown by the curve a in FIG. 32, when the antenna unit operating in the third radiation mode resonates, the S11 parameter is relatively small, and an antenna return loss is relatively low. In this case, antenna radiation efficiency is relatively high. For the antenna radiation efficiency of the antenna unit operating in the third radiation mode, refer to a curve 1 in FIG. 33. As shown by the curve 1 in FIG. 33, when the antenna unit operating in the third radiation mode resonates, the antenna radiation efficiency is relatively high.

Simulation diagrams of the radiation direction of the antenna unit when the antenna unit operates in the fourth radiation mode are shown in (d), (e), and (f) in FIG. 31. Referring to (d), (e), and (f) in FIG. 31, when the antenna unit operating in the fourth radiation mode resonates in the N78 (3.3 GHz to 3.7 GHz) frequency band, the main radiation direction is a second direction.

A distribution diagram of the S11 parameter when the antenna unit operates in the fourth radiation mode is shown by a curve b in FIG. 32. As shown by the curve b in FIG. 32, when the antenna unit operating in the fourth radiation mode resonates, the S11 parameter is relatively small, and an antenna return loss is relatively low. In this case, antenna radiation efficiency is relatively high. For the antenna radiation efficiency of the antenna unit operating in the fourth radiation mode, refer to a curve 2 in FIG. 33. As shown by the curve 2 in FIG. 6, when the antenna unit operating in the fourth radiation mode resonates, the antenna radiation efficiency is relatively high.

Simulation diagrams of a radiation direction of the antenna unit when the antenna unit operates in the fifth radiation mode are shown in (g), (h), and (i) in FIG. 31. Referring to (g), (h), and (i) in FIG. 31, when the antenna unit operating in the fifth radiation mode resonates in the first frequency band, a main radiation direction is a third direction.

A distribution diagram of the S11 parameter when the antenna unit operates in the fifth radiation mode is shown by a curve a in FIG. 32. As shown by the curve a in FIG. 32, when the antenna unit operating in the fifth radiation mode resonates, the S11 parameter is relatively small, and an antenna return loss is relatively low. In this case, antenna radiation efficiency is relatively high. For the antenna radiation efficiency of the antenna unit operating in the fifth radiation mode, refer to a curve 3 in FIG. 33. As shown by the curve 1 in FIG. 33, when the antenna unit operating in the fifth radiation mode resonates, the antenna radiation efficiency is relatively high.

In addition, for the antenna system efficiency of the antenna unit operating in the third radiation mode, refer to a curve 1-1 in FIG. 33. For the antenna system efficiency of the antenna unit operating in the fourth radiation mode, refer to a curve 2-1 in FIG. 33. For antenna system efficiency of the antenna unit operating in the fifth radiation mode, refer to a curve 2-1 in FIG. 33.

Based on the foregoing accompanying drawings, the main radiation direction of the radiator in the third radiation mode is the first direction, the main radiation direction of the radiator in the fourth radiation mode is the second direction, and the main radiation direction of the radiator in the fifth radiation mode is the third direction. The first direction points to the bottom left, the second direction points to the left, and the third direction points to the top left.

Therefore, according to the antenna unit provided in this embodiment of this application, distributed feeding is performed on the metal frame radiator, and the first radiator and the second radiator that are disposed on the housing. The tunable capacitors are disposed, so that the main radiation direction of the metal frame antenna can be changed, and further, the impact of gripping by the user on the antenna radiation performance can be reduced.

Figure 34:
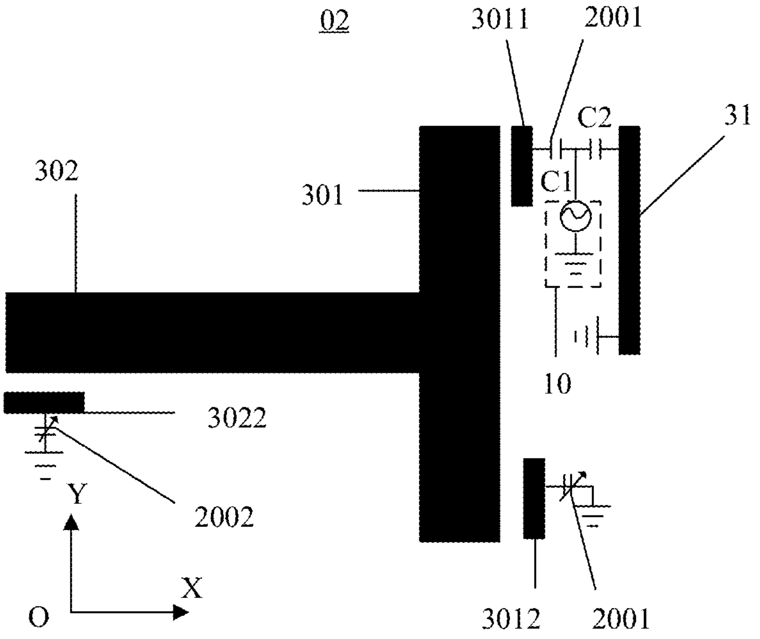
FIG. 34 is a schematic diagram depicting a structure of another antenna unit according to an embodiment of this application.

In some examples of this application, as shown in FIG. 34, the antenna unit 02 includes a frame radiator 31 disposed on the middle frame 3, and a first radiator 301 and a second radiator 302 that are disposed on the rear housing 4.

The first radiator 301 and the second radiator 302 intersect. An included angle between the first radiator 301 and the second radiator 302 is 90°.

A first feeding coupling structure 3011 is disposed at a first end of the first radiator 301. A feeding unit 10 feeds the first radiator 301 in a coupling manner through the first feeding coupling structure 3011.

A difference from the foregoing embodiment lies in that a third end of the second radiator 302 is connected to a connection point of the first radiator 301. The connection point of the first radiator 301 is located between the first end and a second end of the first radiator 301. In this example, the connection point of the first radiator 301 is located at a middle position between the first end and the second end of the first radiator 301.

A first grounding coupling structure 3012 is disposed at the second end of the first radiator 301. The first grounding coupling structure 3012 is coupled to the first radiator 301. The first radiator 301 is grounded in a coupling manner through the first grounding coupling structure 3012.

Correspondingly, a second grounding coupling structure 3022 is disposed at a fourth end of the second radiator 302. The second grounding coupling structure 3022 is coupled to the first radiator 301. The second radiator 302 is grounded in a coupling manner through the second grounding coupling structure 3022.

In addition, a first tunable capacitor 2001 is connected in series between the first grounding coupling structure 3012 and a ground plane. A second tunable capacitor 2002 is connected in series between the second grounding coupling structure 3022 and the ground plane. Capacitance values of the first tunable capacitor 2001 and the second tunable capacitor 2002 are adjustable. The first tunable capacitor 2001 and the second tunable capacitor 2002 are configured to adjust a resonance frequency.

During operation, when the first tunable capacitor 2001 is connected and the second tunable capacitor 2002 is disconnected, a current of the first radiator 301 separately flows from the first end of the first radiator 301 to the second end of the first radiator 301, and an operating mode of the first radiator 301 is a differential mode (DM).

When the first tunable capacitor 2001 is disconnected and the second tunable capacitor 2002 is connected, the current of the first radiator 301 flows from the first end of the first radiator 301 and the second end of the first radiator 301 to the second radiator respectively, and an operating mode of the first radiator 301 and the second radiator is a common mode (CM).

Therefore, capacitance values of the first tunable capacitor 2001 and the second tunable capacitor 2002 may be adjusted to implement switching between the common mode and the differential mode. This can flexibly adjust a main radiation direction of the antenna unit to reduce the impact of gripping by the user on the antenna radiation performance.

Figure 35:
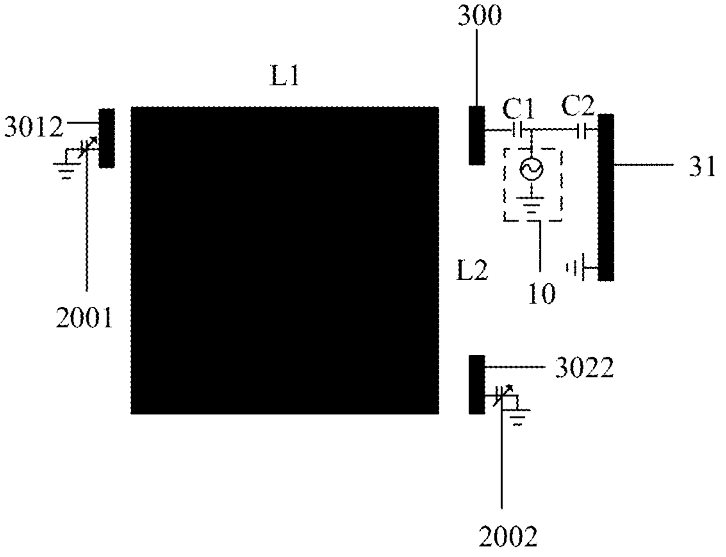
FIG. 35 is a schematic diagram depicting a structure of another antenna unit according to an embodiment of this application.

In some other embodiments of this application, as shown in FIG. 35, the antenna unit 02 includes a frame radiator 31 disposed on the middle frame 3 and a metal plate 32 disposed on the rear housing 4. The metal plate 32 includes a first edge L1 and a second edge L2 that intersect.

An included angle between the first edge L1 and the second edge L2 is 90°.

Extension directions of the frame radiator 31 and the first edge L1 in an XOY plane are perpendicular. Extension directions of the frame radiator 31 and the second edge L2 in the XOY plane are parallel.

The first edge L1 and the second edge L2 share one distributed feeding coupling structure 300. A feeding unit feeds two or more radiators in a coupling manner through the one distributed feeding coupling structure 300. The first edge L1 and the second edge L2 are separately parallel to one edge of the distributed feeding coupling structure 300.

The feeding unit 10 is electrically connected to the frame radiator 31 through a first capacitive element C1, and is electrically connected to the distributed feeding coupling structure 300 through a second capacitive element C2.

A first grounding coupling structure 3012 is disposed at a second end of the first edge L1. The first grounding coupling structure 3012 is coupled to the first edge L1. The first edge L1 is grounded in a coupling manner through the first grounding coupling structure 3012.

Correspondingly, a second grounding coupling structure 3022 is disposed at a second end of the second edge L2. The second grounding coupling structure 3022 is coupled to the first edge L1. The second edge L2 is grounded in a coupling manner through the second grounding coupling structure 3022.

In addition, a first tunable capacitor 2001 is connected in series between the first grounding coupling structure 3012 and a ground plane. A second tunable capacitor 2002 is connected in series between the second grounding coupling structure 3022 and the ground plane. Capacitance values of the first tunable capacitor 2001 and the second tunable capacitor 2002 are adjustable. The first tunable capacitor 2001 and the second tunable capacitor 2002 are configured to adjust a resonance frequency.

During operation, the frame radiator 31 is always in an on state, and operates in a first frequency band.

The capacitance values of the first tunable capacitor 2001 and the second tunable capacitor 2002 are adjustable.

When the capacitance values of the first tunable capacitor 2001 and the second tunable capacitor are both less than a preset threshold, a resonance frequency of the first tunable capacitor 2001 is outside a first frequency band, and the first tunable capacitor 2001 and the second tunable capacitor 2002 do not resonate and are in a high-resistance state. In this case, the first tunable capacitor 2001 and the second tunable capacitor are similar to an insulator, and the feeding unit 10 is disconnected from the first edge L1 and the second edge L2.

In this case, only the frame radiator 31 operates in the first frequency band, and the antenna unit operates in a third radiation mode.

Correspondingly, when the capacitance value of the first tunable capacitor 2001 is a preset threshold and the capacitance value of the second tunable capacitor 2002 is less than the preset threshold, a resonance frequency of the first tunable capacitor 2001 is in a first frequency band, and the first tunable capacitor 2001 resonates and is in a low-resistance state. In this case, the first tunable capacitor 2001 is similar to a conductor, and the feeding unit 10 is conductively connected to the first edge L1.

When an electromagnetic wave whose frequency is in the first frequency band is transmitted to the second tunable capacitor 2002, the second tunable capacitor 2002 does not resonate and is in a high-resistance state, because a resonance frequency of the second tunable capacitor 2002 is outside the first frequency band. In this case, the second tunable capacitor 2002 is similar to an insulator, and the feeding unit 10 is disconnected from the second edge L2.

In this case, the frame radiator 31 and the first edge L1 operate in the first frequency band, and the antenna unit 02 operates in a fourth radiation mode.

Correspondingly, when the capacitance value of the first tunable capacitor 2001 is less than a preset threshold and the capacitance value of the second tunable capacitor 2002 is the preset threshold, a resonance frequency of the first tunable capacitor 2001 is outside a first frequency band, and the first tunable capacitor 2001 does not resonate and is in a high-resistance state. In this case, the first tunable capacitor 2001 is similar to an insulator, and the feeding unit 10 is disconnected from the first edge L1.

A resonance frequency of the second tunable capacitor 2002 is in the first frequency band, and the second tunable capacitor 2002 resonates and is in a low-resistance state. In this case, the second tunable capacitor 2002 is similar to a conductor, and the feeding unit 10 is conductively connected to the second edge L2.

In this case, the frame radiator 31 and the second edge L2 operate in the first frequency band, and the antenna unit 02 operates in a fifth radiation mode.

Figure 36:
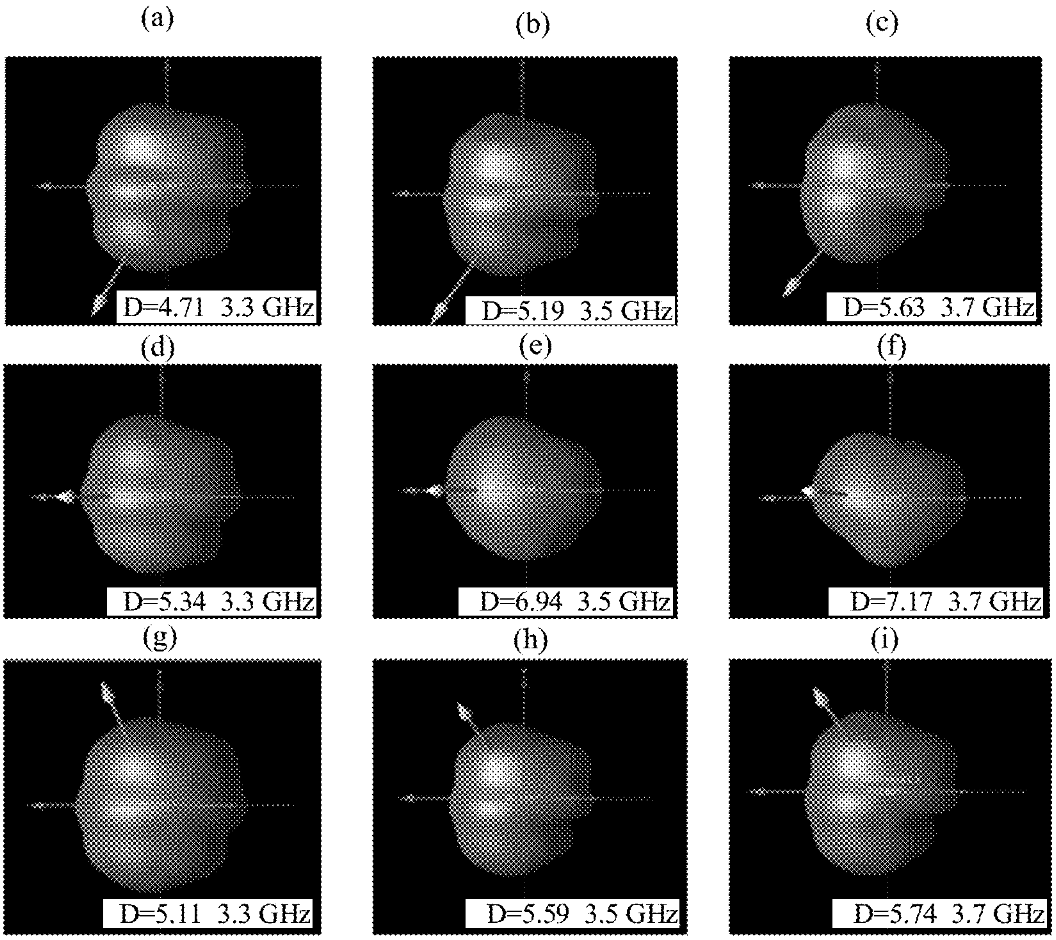
FIG. 36 is a simulation diagram of a radiation direction of the antenna unit in FIG. 35.
Figure 37:
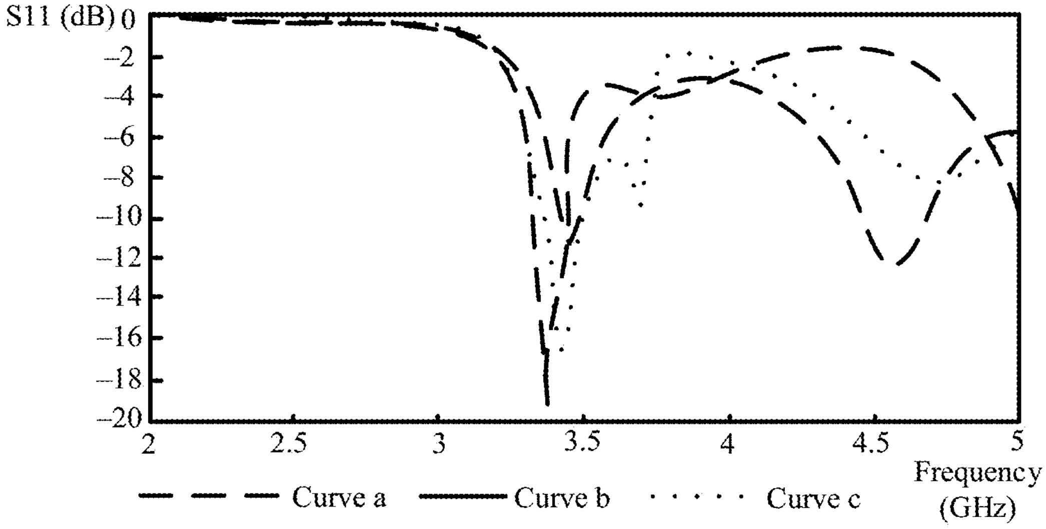
FIG. 37 is a distribution diagram of an S11 parameter of the antenna unit in FIG. 35.
Figure 38:
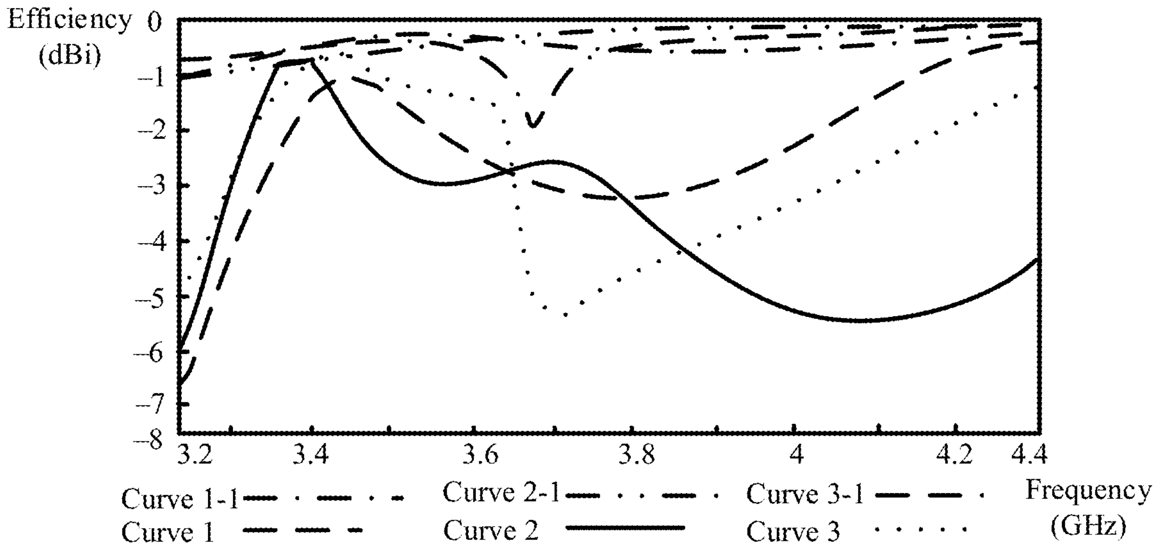
FIG. 38 is a schematic diagram of radiation efficiency of the antenna unit in FIG. 35.

FIG. 36 is a simulation diagram of a radiation direction of another antenna unit according to an embodiment of this application. FIG. 37 is a distribution diagram of an S11 parameter of another antenna unit according to an embodiment of this application. FIG. 38 is a schematic diagram of antenna radiation efficiency of an antenna unit according to an embodiment of this application.

A capacitance value of C1 is 0.2 pF. A capacitance value of C2 is 0.2 pF.

When the antenna unit operates in the third radiation mode, the capacitance value of the first tunable capacitor 2001 is 0.3 pF, and the capacitance value of the second tunable capacitor is 0.3 pF.

When the antenna unit operates in the fourth radiation mode, the capacitance value of the first tunable capacitor 2001 is 1.2 pF, and the capacitance value of the second tunable capacitor is 0.3 pF.

When the antenna unit operates in the fourth radiation mode, the capacitance value of the first tunable capacitor 2001 is 0.3 pF, and the capacitance value of the second tunable capacitor is 1.2 pF.

The first frequency band is, for example, an N78 frequency band.

Simulation diagrams of a radiation direction of the antenna unit when the antenna unit operates in the third radiation mode are shown in (a), (b), and (c) in FIG. 36. Referring to (a), (b), and (c) in FIG. 36, when the antenna unit operating in the third radiation mode resonates in the first frequency band, a main radiation direction is a first direction.

A distribution diagram of an S11 parameter when the antenna unit operates in the third radiation mode is shown by a curve a in FIG. 37. As shown by the curve a in FIG. 37, when the antenna unit operating in the third radiation mode resonates, the S11 parameter is relatively small, and an antenna return loss is relatively low. In this case, antenna radiation efficiency is relatively high. For the antenna radiation efficiency of the antenna unit operating in the third radiation mode, refer to a curve 1 in FIG. 38. As shown by the curve 1 in FIG. 38, when the antenna unit operating in the third radiation mode resonates, the antenna radiation efficiency is relatively high.

Simulation diagrams of the radiation direction of the antenna unit when the antenna unit operates in the fourth radiation mode are shown in (d), (e), and (f) in FIG. 36. Referring to (d), (e), and (f) in FIG. 36, when the antenna unit operating in the fourth radiation mode resonates in the N78 (3.3 GHz to 3.7 GHz) frequency band, the main radiation direction is a second direction.

A distribution diagram of the S11 parameter when the antenna unit operates in the fourth radiation mode is shown by a curve b in FIG. 37. As shown by the curve b in FIG. 37, when the antenna unit operating in the fourth radiation mode resonates, the S11 parameter is relatively small, and an antenna return loss is relatively low. In this case, antenna radiation efficiency is relatively high. For the antenna radiation efficiency of the antenna unit operating in the fourth radiation mode, refer to a curve 2 in FIG. 38. As shown by the curve 2 in FIG. 6, when the antenna unit operating in the fourth radiation mode resonates, the antenna radiation efficiency is relatively high.

Simulation diagrams of a radiation direction of the antenna unit when the antenna unit operates in the fifth radiation mode are shown in (g), (h), and (i) in FIG. 36. Referring to (g), (h), and (i) in FIG. 36, when the antenna unit operating in the fifth radiation mode resonates in the first frequency band, a main radiation direction is a third direction.

A distribution diagram of the S11 parameter when the antenna unit operates in the fifth radiation mode is shown by a curve a in FIG. 37. As shown by the curve a in FIG. 37, when the antenna unit operating in the fifth radiation mode resonates, the S11 parameter is relatively small, and an antenna return loss is relatively low. In this case, antenna radiation efficiency is relatively high. For the antenna radiation efficiency of the antenna unit operating in the fifth radiation mode, refer to a curve 3 in FIG. 38. As shown by the curve 1 in FIG. 38, when the antenna unit operating in the fifth radiation mode resonates, the antenna radiation efficiency is relatively high.

In addition, for the antenna system efficiency of the antenna unit operating in the third radiation mode, refer to a curve 1-1 in FIG. 38. For the antenna system efficiency of the antenna unit operating in the fourth radiation mode, refer to a curve 2-1 in FIG. 38. For antenna system efficiency of the antenna unit operating in the fifth radiation mode, refer to a curve 2-1 in FIG. 38.

Based on the foregoing accompanying drawings, the main radiation direction of the radiator in the third radiation mode is the first direction, the main radiation direction of the radiator in the fourth radiation mode is the second direction, and the main radiation direction of the radiator in the fifth radiation mode is the third direction. The first direction points to the bottom left, the second direction points to the left, and the third direction points to the top left.

Therefore, according to the antenna unit provided in this embodiment of this application, distributed feeding is performed on the metal frame radiator, and the first radiator and the second radiator that are disposed on the housing. The tunable capacitors are disposed, so that a main radiation direction of a metal frame antenna can be changed, and further, the impact of gripping by the user on the antenna radiation performance can be reduced.

Figure 39:
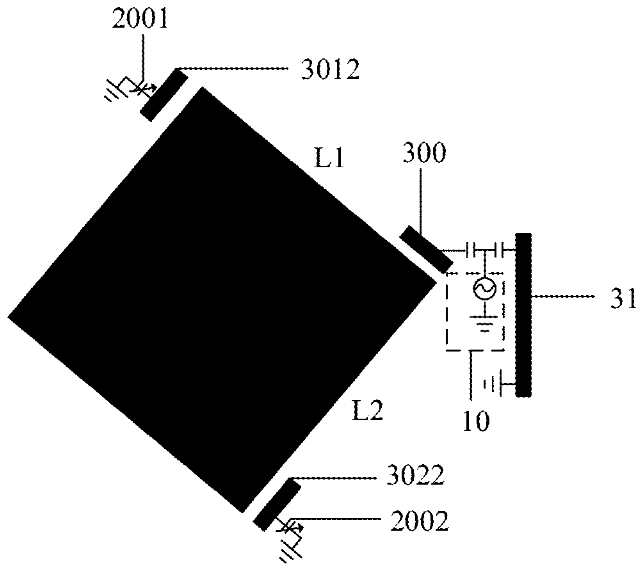
FIG. 39 is a schematic diagram depicting a structure of another antenna unit according to an embodiment of this application.

In some other embodiments of this application, as shown in FIG. 39, the entire antenna unit 02 in the foregoing embodiment may be rotated by a preset angle.

When the antenna unit 02 rotates by the preset angle, the main radiation direction of the antenna unit 02 rotates by the preset angle accordingly to change the main radiation direction. This can further reduce the impact of gripping on the antenna radiation performance.

It should be noted that the antenna unit provided in this embodiment of this application is not limited to a combination of the frame radiator 31 disposed on the middle frame 3 and the metal radiator disposed on the rear housing 4, and may alternatively be an antenna disposed at a position of the middle frame and formed on a support grounding structure by using a laser direct structuring technology. Certainly, the antenna unit may alternatively be a combination of a support antenna and the frame radiator 31 disposed on the middle frame 3, or may be a combination of a support antenna and the metal radiator disposed on the rear housing 4.

Figure 40:
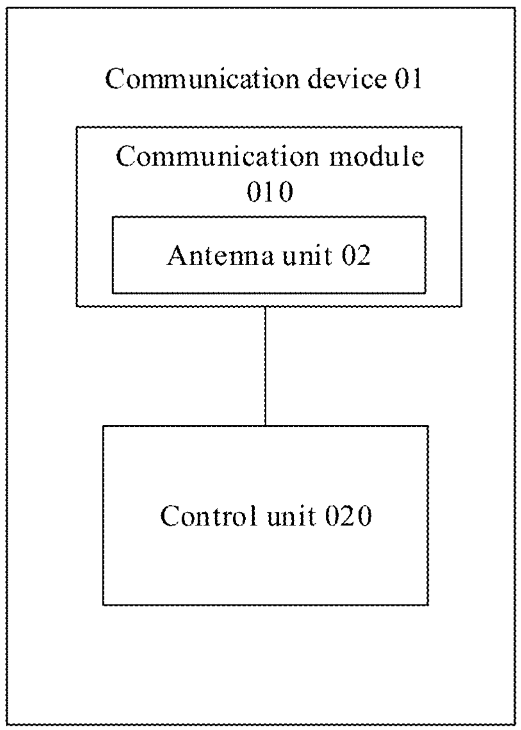
FIG. 40 is a framework diagram of a communication device according to an embodiment of this application.

As shown in FIG. 40, the communication device 01 may further include a communication module 010 and a control unit 020.

For example, the communication module 010 includes the antenna unit 02 in the foregoing embodiment, a mobile communication module, a wireless communication module, a modem processor, a baseband processor, and the like.

An antenna may be configured to transmit and receive an electromagnetic wave signal. Each antenna in a smart appliance may be configured to cover one or more communication frequency bands.

The mobile communication module may provide a wireless communication solution that is applied to the smart appliance, and that includes second-generation mobile phone communication technology specification (2-Generation wireless telephone technology, 2G), a third-generation mobile communication technology (3rd-Generation, 3G), a fourth-generation mobile communication technology (4th generation mobile communication technology, 4G), a fifth-generation mobile communication technology (5th generation wireless systems, 5G), or the like. The mobile communication module may include at least one filter, a switch, a power amplifier, a low noise amplifier (LNA), and the like. The mobile communication module may receive an electromagnetic wave through the antenna, perform processing such as filtering or amplification on the received electromagnetic wave, and transmit the electromagnetic wave to the modem processor for demodulation. The mobile communication module may further amplify a signal modulated by the modem processor, and convert a signal obtained through amplification into an electromagnetic wave for radiation through the antenna. In some embodiments, at least some functional modules of the mobile communication module may be disposed in a processor 001. In some embodiments, at least some functional modules of the mobile communication module may be disposed in a same device as at least some modules of the processor 001.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to an application processor. The application processor outputs a sound signal through an audio device (which is not limited to a speaker, a microphone, or the like), or displays an image or a video through a display screen 009. In some embodiments, the modem processor may be an independent component. In some other embodiments, the modem processor may be independent of the processor 001, and is disposed in a same device as the mobile communication module or another functional module.

The wireless communication module may provide a wireless communication solution that is applied to the smart appliance, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module may be integrated with at least one communication processor module 014. The wireless communication module receives an electromagnetic wave through the antenna, performs frequency modulation and filtering processing on an electromagnetic wave signal, and sends a processed signal to the processor 001. The wireless communication module may further receive a to-be-sent signal from the processor 001, perform frequency modulation and amplification on the signal, and convert the signal into an electromagnetic wave for radiation through the antenna.

In some embodiments, one antenna of the smart appliance is coupled to the mobile communication module, and the other antenna is coupled to the wireless communication module, so that the smart appliance may communicate with a network and another device through a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The control unit 020 may be configured to control connection/disconnection of the feeding unit and the radiator in the antenna unit 02 in the communication module 010. The antenna unit has different main radiation directions when the tuning unit is connected to different radiators. The main radiation direction of the antenna unit is the direction with the greatest directivity in the radiation pattern of the antenna unit.

For example, when the user uses the electronic device in the portrait mode or the landscape mode, a connection status of one or more switch units of the antenna unit is controlled, so that the main radiation direction of the antenna unit is staggered with a gripping position of the user.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An antenna, comprising:

a first radiator, wherein the first radiator comprises a first end and a second end that are opposite to each other, and the second end of the first radiator or a middle position of the first radiator is grounded;

a second radiator, wherein the second radiator comprises a third end and a fourth end that are opposite to each other, the fourth end of the second radiator is disposed away from the first end of the first radiator relative to the third end, and the fourth end of the second radiator or a middle position of the second radiator is grounded;

a feeding circuit, wherein the feeding circuit is configured to feed the first radiator and the second radiator, at the first end of the first radiator and the third end of the second radiator; and a tuning circuit, wherein the tuning circuit is configured to selectively connect the feeding circuit to the first end of the first radiator to feed the first radiator, and selectively connect the feeding circuit to the third end of the second radiator to feed the second radiator, wherein the antenna has different main radiation directions when the tuning circuit connects the feeding circuit to only the first radiator and when the tuning circuit connects the feeding circuit to only the second radiator, and the main radiation direction of the antenna is a direction with a greatest directivity in a radiation pattern of the antenna.

2. The antenna according to claim 1, wherein an included angle between an extension direction of the first radiator at the first end and an extension direction of the second radiator at the third end is a first angle, and the first angle ranges from 60° to 120°.

3. The antenna according to claim 2, wherein the first angle is 90°.

4. The antenna according to claim 2, wherein when the tuning circuit connects the feeding circuit to the first end of the first radiator, the main radiation direction of the antenna is a first direction; when the tuning circuit connects the feeding circuit to the third end of the second radiator, the main radiation direction of the antenna is a second direction; and an included angle between the first direction and the second direction is a second angle.

5. The antenna according to claim 4, wherein the antenna further comprises:

a feeding coupling structure, wherein the feeding coupling structure is disposed among the feeding circuit, the first end of the first radiator, and the third end of the second radiator, the feeding coupling structure is coupled to the first radiator and the second radiator, and the feeding circuit is electrically connected to the feeding coupling structure; and a grounding coupling structure, wherein the grounding coupling structure is disposed between the second end of the first radiator and a ground plane or between the middle position of the first radiator and a ground plane, and is disposed between the fourth end of the second radiator and the ground plane or between the middle position of the second radiator and the ground plane, the grounding coupling structure is coupled to the first radiator and the second radiator, and the grounding coupling structure is electrically connected to the ground plane; and when the feeding circuit feeds the first radiator through the feeding coupling structure, the main radiation direction of the antenna is a third direction; when the feeding circuit feeds the second radiator through the feeding coupling structure, the main radiation direction of the antenna is a fourth direction; an included angle between the third direction and the fourth direction is a third angle; and the third angle is greater than the second angle.

6. The antenna according to claim 5, wherein there are a plurality of feeding coupling structures, each of the plurality of feeding coupling structures is coupled to one of the first radiator or the second radiator, the tuning circuit is disposed between the feeding circuit and the plurality of feeding coupling structures, and the feeding circuit is electrically connected to the plurality of feeding coupling structures through the tuning circuit.

7. The antenna according to claim 5, wherein there is one feeding coupling structure, each of the first radiator and the second radiator is coupled to one edge of the feeding coupling structure, the tuning circuit is disposed between the grounding coupling structure and the ground plane, and the grounding coupling structure is electrically connected to the ground plane through the tuning circuit.

8. The antenna according to claim 1, wherein the antenna further comprises:

a third radiator, wherein the third radiator comprises a fifth end and a sixth end that are opposite to each other, the sixth end of the third radiator is disposed away from the first end of the first radiator relative to the fifth end, and the sixth end of the third radiator or a middle position of the third radiator is grounded;

the feeding circuit is configured to feed the third radiator at the fifth end of the third radiator; and the tuning circuit is configured to selectively connect the feeding circuit to the third radiator to feed the third radiator.

9. The antenna according to claim 8, wherein an included angle between the first radiator and the third radiator or between the second radiator and the third radiator is a fourth angle, and the fourth angle ranges from 60° to 120°.

10. The antenna according to claim 8, wherein the tuning circuit connects the third radiator to the feeding circuit; or the tuning circuit connects at least one of the first radiator or the second radiator to the feeding circuit; or the tuning circuit connects the third radiator and at least one of the first radiator or the second radiator to the feeding circuit.

11. The antenna according to claim 8, wherein the tuning circuit comprises at least one switch, wherein the at least one switch is disposed among the feeding circuit, the first radiator, the second radiator, and the third radiator, and the at least one switch is configured to selectively connect the feeding circuit to at least one radiator of the first radiator, the second radiator, or the third radiator; or the at least one switch is disposed among the first radiator, the second radiator, the third radiator, and the ground plane, and the at least one switch is configured to selectively connect the ground plane to at least one radiator of the first radiator, the second radiator, or the third radiator.

12. The antenna according to claim 1, wherein the tuning circuit comprises at least one tunable capacitor, and the at least one tunable capacitor is connected in series between the feeding circuit and the feeding coupling structure, or is connected in series between the grounding coupling structure and the ground plane; and when a capacitance value of the at least one tunable capacitor is a preset threshold, a resonance frequency of the at least one tunable capacitor is in a first frequency band, wherein the first frequency band is an operating frequency band of the antenna, or when a capacitance value of the at least one tunable capacitor is less than a preset threshold, a resonance frequency of the at least one tunable capacitor is outside a first frequency band.

13. The antenna according to claim 1, wherein the third end of the second radiator is connected to a connection point on the first radiator, and the connection point on the first radiator is located between the first end and the second end.

14. The antenna according to claim 1, wherein the antenna is a patch antenna, the antenna comprises a first edge portion and a second edge portion that intersect, the first edge portion of the antenna is used as the first radiator, the second edge portion of the antenna is used as the second radiator, one end of the first edge portion and one end of the second edge portion that intersect each are coupled to the feeding circuit, and the other end of the first edge portion and the other end of the second edge portion each are coupled to the ground plane.

15. The antenna according to claim 8, wherein the antenna further comprises at least one capacitive element, the at least one capacitive element is disposed among the feeding circuit, the first radiator, the second radiator, and the third radiator, and the feeding circuit is coupled to at least one radiator of the first radiator, the second radiator, and the third radiator through the at least one capacitive element.

16. A communication device, comprising a radio frequency module and an antenna, wherein the radio frequency module is electrically connected to the antenna, the antenna comprising:

a first radiator, wherein the first radiator comprises a first end and a second end that are opposite to each other, and the second end of the first radiator or a middle position of the first radiator is grounded;

a second radiator, wherein the second radiator comprises a third end and a fourth end that are opposite to each other, the fourth end of the second radiator is disposed away from the first end of the first radiator relative to the third end, and the fourth end of the second radiator or a middle position of the second radiator is grounded;

a feeding circuit, wherein the feeding circuit is configured to feed the first radiator and the second radiator, at the first end of the first radiator and the third end of the second radiator; and a tuning circuit, wherein the tuning circuit is configured to selectively connect the feeding circuit to the first end of the first radiator to feed the first radiator, and selectively connect the feeding circuit to the third end of the second radiator to feed the second radiator, wherein the antenna has different main radiation directions when the tuning circuit connects the feeding circuit to only the first radiator and when the tuning circuit connects the feeding circuit to only the second radiator, and the main radiation direction of the antenna is a direction with a greatest directivity in a radiation pattern of the antenna.

17. The communication device according to claim 16, wherein the communication device comprises a rear housing, and at least one radiator of the antenna is disposed on the rear housing.

18. The communication device according to claim 17, wherein the rear housing is made of glass or ceramic.

19. The communication device according to claim 16, wherein the communication device further comprises a middle frame, the middle frame comprises a bearing plate and a frame around the bearing plate, and at least one radiator of the antenna is disposed on the frame.

20. The communication device according to claim 19, wherein a printed circuit board PCB is disposed on the bearing plate, the feeding circuit, the ground plane, and the tuning circuit are disposed on the PCB, the feeding coupling structure is electrically connected to the feeding circuit, and the grounding coupling structure is electrically connected to the ground plane.

* * * * *